United States Patent
Drazic

(10) Patent No.: US 12,062,101 B2
(45) Date of Patent: Aug. 13, 2024

(54) CREATING A TIME ENTRY BASED ON AUTOMATICALLY TRACKING USER ACTIVITY

(71) Applicant: Coing Inc., Palo Alto, CA (US)

(72) Inventor: Marina Drazic, Novi Sad (RS)

(73) Assignee: COING INC., Palo Alto, CA (US)

( * ) Notice: Subject to any disclaimer, the term of this patent is extended or adjusted under 35 U.S.C. 154(b) by 293 days.

(21) Appl. No.: 17/742,937

(22) Filed: May 12, 2022

(65) Prior Publication Data

US 2023/0368309 A1 Nov. 16, 2023

(51) Int. Cl.
*G06Q 40/12* (2023.01)
*G06F 11/30* (2006.01)
*G06F 11/34* (2006.01)

(52) U.S. Cl.
CPC ......... *G06Q 40/125* (2013.12); *G06F 11/302* (2013.01); *G06F 11/3438* (2013.01)

(58) Field of Classification Search
CPC .......... G06Q 40/125; G06F 11/302; G06F 11/3438
See application file for complete search history.

(56) References Cited

U.S. PATENT DOCUMENTS

| | | | |
|---|---|---|---|
| 10,489,462 B1* | 11/2019 | Rogynskyy | H04L 12/14 |
| 2010/0100463 A1* | 4/2010 | Molotsi | G06Q 10/04 |
| | | | 705/1.1 |
| 2012/0166635 A1* | 6/2012 | Tokuyama | G06Q 10/06 |
| | | | 709/224 |
| 2020/0090132 A1* | 3/2020 | Bender | G06F 16/337 |

* cited by examiner

*Primary Examiner* — A. Hunter Wilder
(74) *Attorney, Agent, or Firm* — PERKINS COIE LLP

(57) ABSTRACT

The system creates a first start time and a first recording of a first user interface with which a user is interacting. Upon determining that the user is not interacting with the first user interface, the system creates a first end time, a second start time, and a second recording of a second user interface with which the user is interacting. Upon obtaining an indication to create a second end time, the system creates the second end time. The system calculates a first difference between the first end time and first start time and a second difference between the second end time and second start time. The system obtains a first task and second task associated with the first recording and second recording, respectively. Based on the first and second differences and the first and second tasks, the system creates a first and a second time entry, respectively.

16 Claims, 23 Drawing Sheets

FIG. 2

| Clockify | | | | COING Demo ▼ ② 🔔 |
|---|---|---|---|---|
| 📅 CALENDAR | | | | |
| 💰 EXPENSES | | | | |
| ⏱ TIME OFF › | | | | |
| ANALYZE | | | | |
| 🔲 DASHBOARD | | | | |
| 📊 REPORTS › | 802 | | | |
| ☒ ACTIVITY › | 4 Aleksandar Olic | 101.00 | 5,050.00 USD | 0.00 USD | 5,050.00 USD |
| MANAGE | 4 Dale | 81.00 | 3,240.00 USD | 0.00 USD | 3,240.00 USD |
| 📋 APPROVALS • | 4 Ethel | 90.00 | 5,400.00 USD | 0.00 USD | 5,400.00 USD |
| 🗂 PROJECTS | 4 Jake | 102.00 | 5,100.00 USD | 0.00 USD | 5,100.00 USD |
| 👥 TEAM | 4 Katie Stark | 75.00 | 120.00 USD | 0.00 USD | 120.00 USD |
| 👤 CLIENT › | 4 Natalia Tawlik | 102.00 | 5,100.00 USD | 0.00 USD | 5,100.00 USD |
| 🏷 TAGS | 4 Yvonne ⁓812 | 102.00 | 4,080.00 USD | 0.00 USD | 4,080.00 USD |
| 📄 INVOICES | Jan 2021 | 35.00 | 1,400.00 USD | 0.00 USD | 1,400.00 USD |
| 📅 SCHEDULE › | Feb 2021 | 30.00 | 1,200.00 USD | 0.00 USD | 1,200.00 USD |
| 💲 SUBSCRIPTION | Mar 2021 | 26.00 | 1,040.00 USD | 0.00 USD | 1,040.00 USD |
| ⚙ SETTINGS | Apr 2021 | 11.00 | 440.00 USD | 0.00 USD | 440.00 USD |
| | 7 ◆ CT2 Web -- California Tech ▨ | 651.02 | 27,870.85 USD | 0.00 USD | 27,870.85 USD |
| | 6 ◆ MI1 App -- Marvel Inc ▨ | 533.00 | 25,600.01 USD | 0.00 USD | 25,600.01 USD |
| | 7 ◆ Office -- COING ▨ | 246.00 | 0.00 USD | 0.00 USD | 0.00 USD |
| | 7 ◆ PTO -- COING ▨ | 91.00 | 0.00 USD | 0.00 USD | 0.00 USD |

*FIG. 8C*

CREATING A TIME ENTRY BASED ON AUTOMATICALLY TRACKING USER ACTIVITY

BACKGROUND

Many workers such as lawyers, freelancers, accountants, etc. need to record an amount of time spent on a task during a workday. With the advent of software, the traditional timecards have been replaced with time-tracking software that enables workers to enter the task and the amount of time spent on the task. However, the workers frequently forget to create the time entry or enter the time entry long after the task is performed. Consequently, the time entries can be inaccurate or altogether omitted.

BRIEF DESCRIPTION OF THE DRAWINGS

Detailed descriptions of implementations of the present invention will be described and explained through the use of the accompanying drawings.

FIG. 2 shows the user interface to create a time entry using the timesheet.

FIGS. 8A-8D show various generated reports associated with the project.

Figure 1:
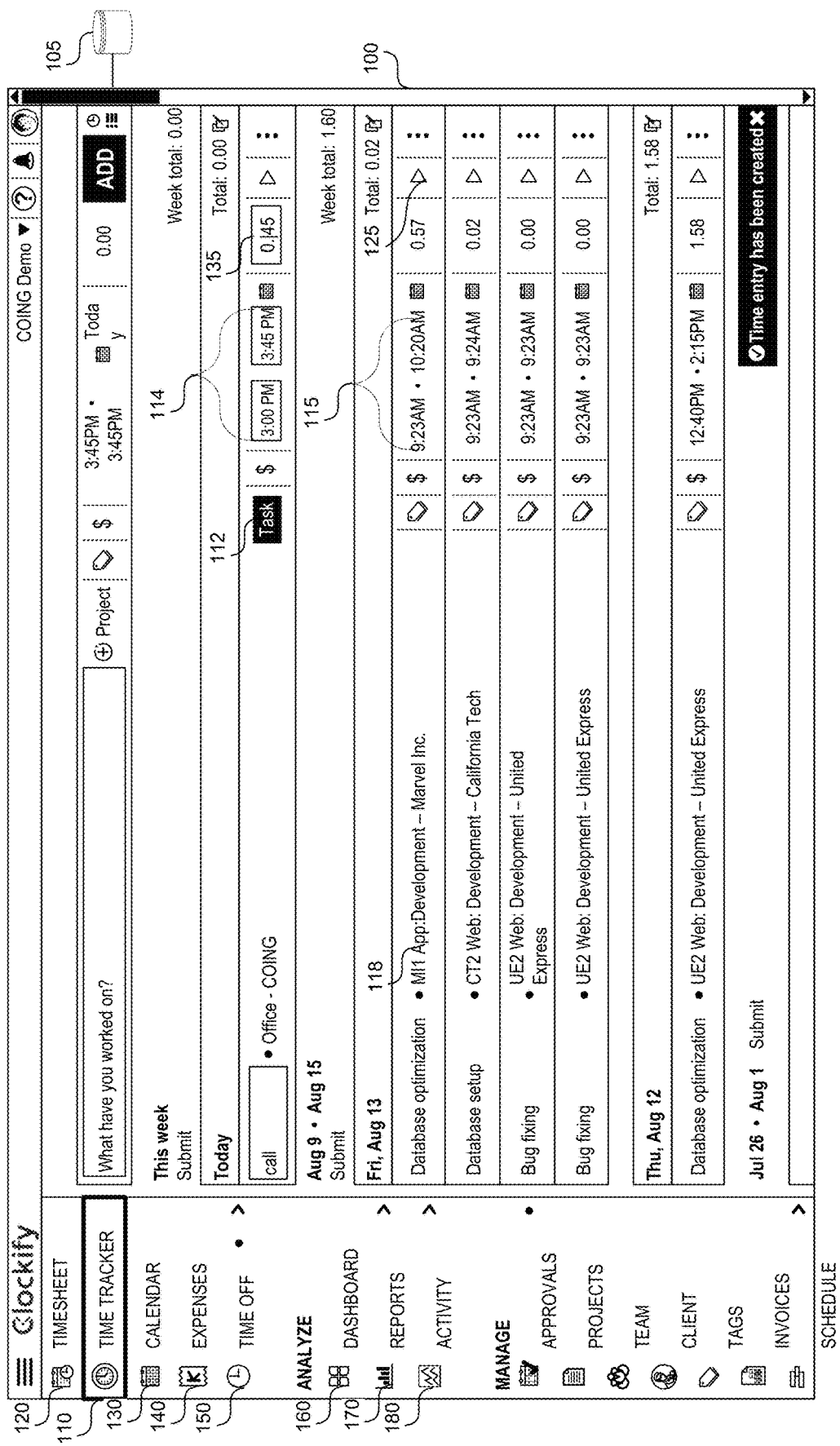
FIG. 1 shows a user interface of a time-tracking software application.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein is a system to automatically create a time entry. The system can provide—from a software application A to a software application B—a user interface element, such as a button, configured to be interactive and presented to the user. The software application A can be a time-tracking software application. The software application B, such as Photoshop, Microsoft Word, Gmail, etc., enables the user to interact with a file. The system can receive from the software application B a first indication of a first interaction with the user interface element, such as a press of the button. Upon receiving the press of the button, the system can start a timer and create a start time associated with the software application A. The system can receive from the software application B a second indication of a second interaction with the user interface element, such as toggling of the button. Upon toggling the button, the system can stop the timer and create an end time associated with the software application A.

To identify the task on which the user worked between the start time and the end time, the system can obtain from the software application B an identifier associated with the file, where the identifier uniquely identifies the file. The identifier can be a file path, the name of the file, metadata associated with the file, contents of the file, etc. The system can extract a word from the identifier, where the word includes an alphanumeric character and is delineated by a delimiting character, such as a " ", "/", "\", ".", ":", "-", etc. The system can determine whether the word uniquely identifies a task associated with the software application A, where the task is a record in a database to which time can be entered. Upon determining that the word uniquely identifies the task associated with the software application A, the system can create a time entry in the software application A based on a difference between the start time and the end time. If needed, the system can combine multiple words to uniquely identify the task. Further, the system can automatically create a description associated with the task based on the identifier. If the identifier is a title of the file, the system can create the description, such as "working on <title of the file>."

The disclosed system can automatically create a time entry based on a calendar entry. The system can receive an indication of a calendar entry associated with the user, such as a selection of one or more calendar entries. The calendar entry describes the event and indicates a duration of the event. The calendar entry can be entered into any calendaring software, such as Google calendar, Outlook calendar, etc. The system can obtain a first identifier associated with the calendar entry. The first identifier can include a title associated with the calendar entry, an indication of a location associated with the calendar entry, or an indication of an invitee associated with the calendar entry. The system can determine whether the first identifier uniquely identifies a task among multiple tasks. To find the uniquely identified task, the system can search the database of the time-tracking software application for the first identifier. Upon determining that the first identifier uniquely identifies the task, the system can create a time entry based on the first identifier and the duration of the event.

Upon determining that the first identifier does not uniquely identify the task, the system can perform the following two steps. First, the system can obtain another identifier associated with the calendar entry, where the other identifier is different from the previously obtained identifier(s). Second, the system can determine whether the previously obtained identifiers and the other identifier uniquely identify the task. The system can perform the two steps described above until the previously obtained identifiers and the other identifier uniquely identify the task or the calendar entry has no more identifiers. Upon determining that the previously obtained identifiers and the other identifier uniquely identify the task, the system can create the time entry based on the identifiers and the duration of the event. Upon determining that the calendar entry has no more identifiers, the system can request input from the user.

The disclosed system can create a time entry based on automatically tracking user activity. The system can create a first start time and a first recording of a first user interface with which the user is interacting. The recording can be an image, a time lapse video, a video, etc., where the recording is created at a first predetermined time interval, such as every five minutes. At a second predetermined time interval, the system can determine whether the user is interacting with the first user interface. The second predetermined time interval can be the same as the first predetermined time interval or can be triggered upon occurrence of an event, such as when the user opens a different file or switches to different software. Upon determining that the user is not interacting with the first user interface, the system can create a first end time.

Upon determining that the user is not interacting with the first user interface, the system can create a second start time and a second recording of a second user interface with which the user is interacting, where the second recording is created at the first predetermined time interval. The system can obtain an indication to create a second end time. The indication to create the second end time can be the determination that the user is not interacting with the second user interface, or the indication can be the user indicating to provide a summary of the time entry so far. Upon obtaining the indication, the system can create a second end time. The system can calculate a first difference between the first end time and the first start time and a second difference between the second end time and the second start time. The system can obtain an indication of a first task associated with the first recording and an indication of a second task associated with the second recording. Based on the first difference and the indication of the first task, the system can create a first time entry, where the first time entry includes a first time duration associated with the first task. The time entry can include project 123675.01 and duration of 1 hour. Based on the second difference and the indication of the second task, the system can create a second time entry, where the second time entry includes a second time duration associated with the second task.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Automatically Creating a Time Entry

FIG. 1 shows a user interface of a time-tracking software application 100. The user interface contains various user interface elements, including time tracker 110, timesheet 120, calendar 130, expenses 140, time off 150, dashboard 160, reports 170, activity 180, etc. By selecting user interface elements timesheet 120, calendar 130, expenses 140, time off 150, dashboard 160, reports 170, activity 180, etc., the user can perform various tasks within the timekeeping software.

The user interface element time tracker 110 enables the user to enter a task 112, 118 (only two labeled for brevity) and a time 114, 115 spent on the task. The task 112, 118 uniquely identifies a record in the time-tracking software application to which time can be entered. The task 112, 118 can be a project or, if the project has many sub-elements to which time can be entered, a sub-element, e.g., task, within the project. The time-tracking software application 100 can store the received data in a database 105 for later retrieval.

In addition, the user interface element 125, when pressed, starts a timer for the associated task, e.g., 112. In other words, the user interface element 125 can create a start time. When the user interface element 125 is toggled, the user interface element stops the timer. In other words, the user interface element 125 can create a stop time. By subtracting the stop time from the start time, the time-tracking software application 100 can determine the duration of the task 112 and can create a time entry including the task 112 and the duration of the task 135.

Figure 2:
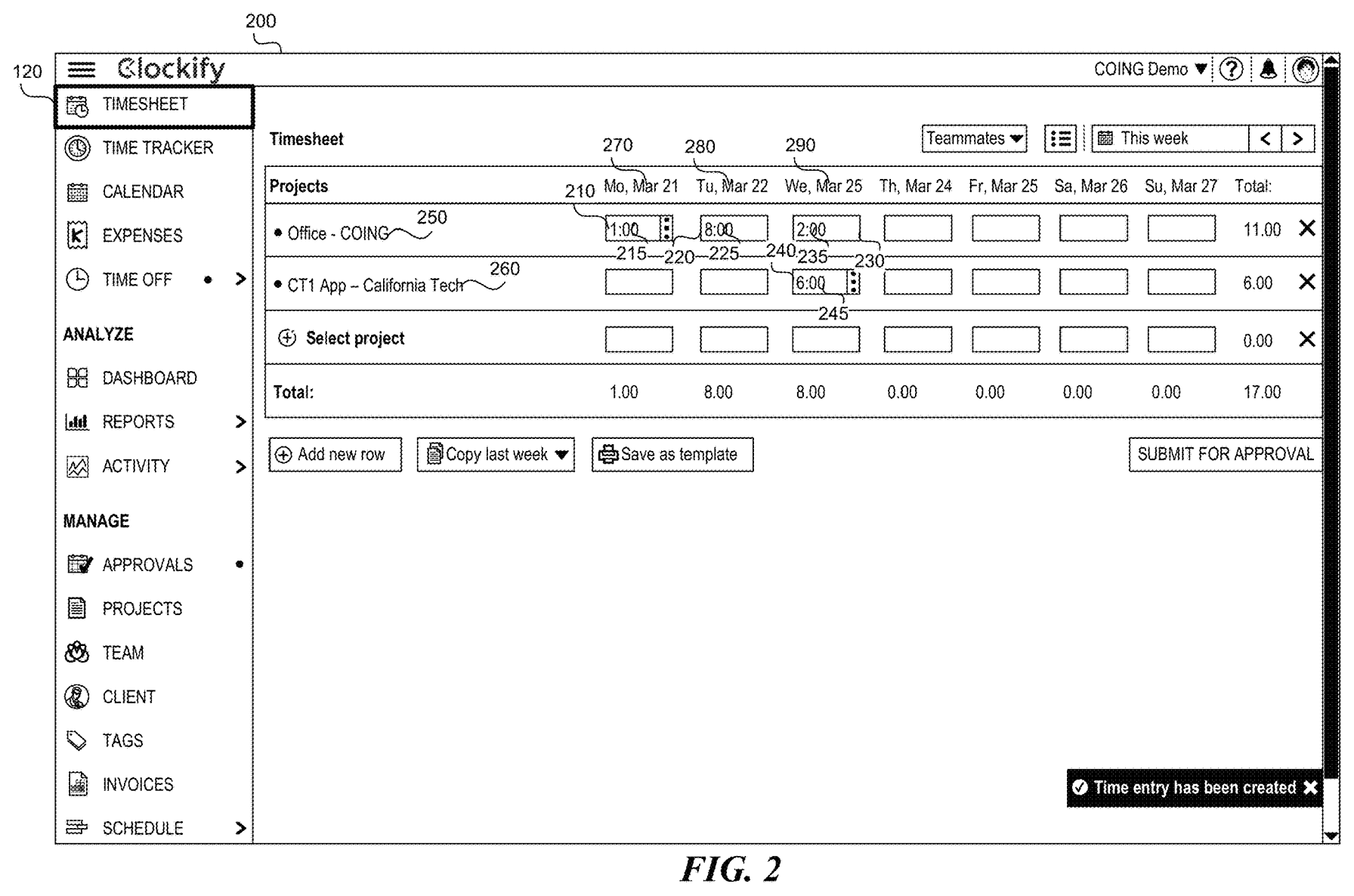

FIG. 2 shows the user interface 200 to create a time entry using the timesheet 120. The user interface 200 enables the user to create a time entry 210, 220, 230, 240, without using a timer. The time entry 210, 220, 230, 240 can be based on a task 250, 260, a date 270, 280, 290, and a time duration 215, 225, 235, 245.

Figure 3A:
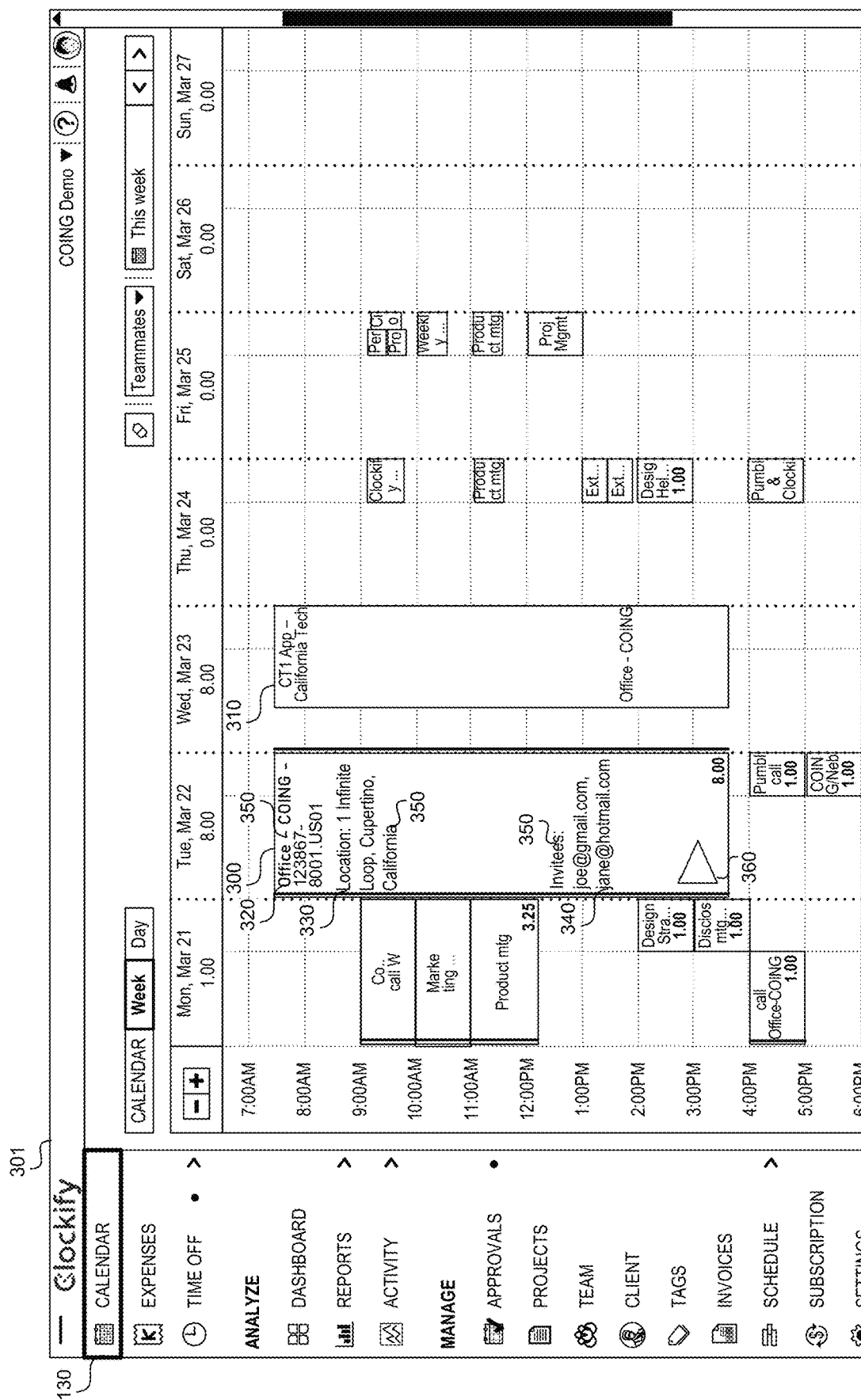
FIG. 3A shows how to create a time entry based on calendar entry, according to one embodiment.

FIG. 3A shows how to create a time entry based on calendar entry, according to one embodiment. Upon receiving a selection of the calendar 130, the processor can present the calendar 301, including calendar entries 300, 310 (only two labeled for brevity). Calendar entries 300, 310 can include an identifier 350 indicating information about title 320, location 330, and/or invitees 340 of the calendar entry. A processor running the time-tracking software application 100 in FIG. 1 can automatically create time entries 210, 220, 230, 240 in FIG. 2 based on the information contained in the calendar entries 300, 310.

For example, the processor can automatically create the time entry 210, 220, 230, 240 in FIG. 2 based on the title 320 of the calendar entry 300. The title 320 can include an identifier 350 associated with the task, such as "123867-8001.US01." The title itself can state "Meet with Alex regarding matter 123867-8001.US01." The processor can extract the identifier 350 from the title 320 by splitting the title into words based on delimiting characters such as a space (" "). The processor can split the above title into the following words: "meet," "with," "Alex," "regarding," "matter," "123867-8001.US01." To isolate the identifier 350, the processor can isolate the words containing a number, because tasks usually contain at least a number in the identifier. The processor can create a time entry 210, 220, 230, 240 for the task associated with the identifier 350 for the time duration equal to the duration of the corresponding calendar entry 300 on the date on which the calendar entry 300 occurred.

In another example, the processor can automatically create the time entry 210, 220, 230, 240 based on the invitees 340. For example, the processor can search for a task associated with invitees 340 in a database associated with the time-tracking software application 100 in FIG. 1. If the processor locates the task associated with invitees 340, the processor can automatically create a time entry 210, 220, 230, 240 based on the task, the duration of the corresponding calendar entry 300, and the date on which the calendar entry occurred.

If the invitees 340 do not uniquely identify the task, the processor can determine whether the invitees 340 identify a subset of tasks among multiple tasks associated with the time-tracking software application 100. If the invitees 340 do identify a subset of tasks among multiple tasks, the processor can use the location 330 and/or title 320 to further identify the unique task among the subset of tasks. For example, the title 320 can only include an identifier 350 that identifies a client, but the client may have multiple tasks associated with it. The invitees 340 can then uniquely identify a particular task among the multiple tasks associated with the client.

In a third example, the processor can automatically create the time entry 210, 220, 230, 240 based on the location 330. The location 330 can be a geographical or a virtual (e.g., an Internet) location. For example, the meeting may occur at the client's headquarters, and the meeting location 330 can uniquely identify a task associated with the client. The processor can determine the task based on the location 330 of the meeting. The processor can automatically create the time entry 210, 220, 230, 240 on the date the calendar entry 300 occurs, for the duration of the calendar entry, and for the client located at the specified location 330. The location can also be virtual and can uniquely identify the client. For example, the client can have a unique Zoom account from which the processor can deduce the unique task associated with the client.

Alternatively, if the processor can only identify the client, e.g., 456877, based on the location 330, and the client has multiple tasks, the processor can use the invitees 340 and/or the title 320 of the meeting to further uniquely identify the task associated with the client. For example, the title 320 can only specify the task without specifying the client. The processor can combine the location 330, which only specifies the client, and the title 320, which can only specify the task, e.g., 8001.US01, to obtain the unique identifier for the task, namely 456877-8001.US01.

The calendar entry 300, 310 can also include a timer 360. By selecting the timer 360, the user can create a start time, and by toggling the timer, the user can create an end time. The difference between the end time and the start time indicates the length of the meeting. The processor can create the time entry 210, 220, 230, 240 based on the difference between the end time and the start time. In addition, the processor can inform the user if there is a difference between the measured time of the meeting and the scheduled time of the meeting. Further, the processor can suggest adjusting a recurring meeting length based on the difference between the measured time of the meeting and the scheduled time of the meeting.

Figure 3B:
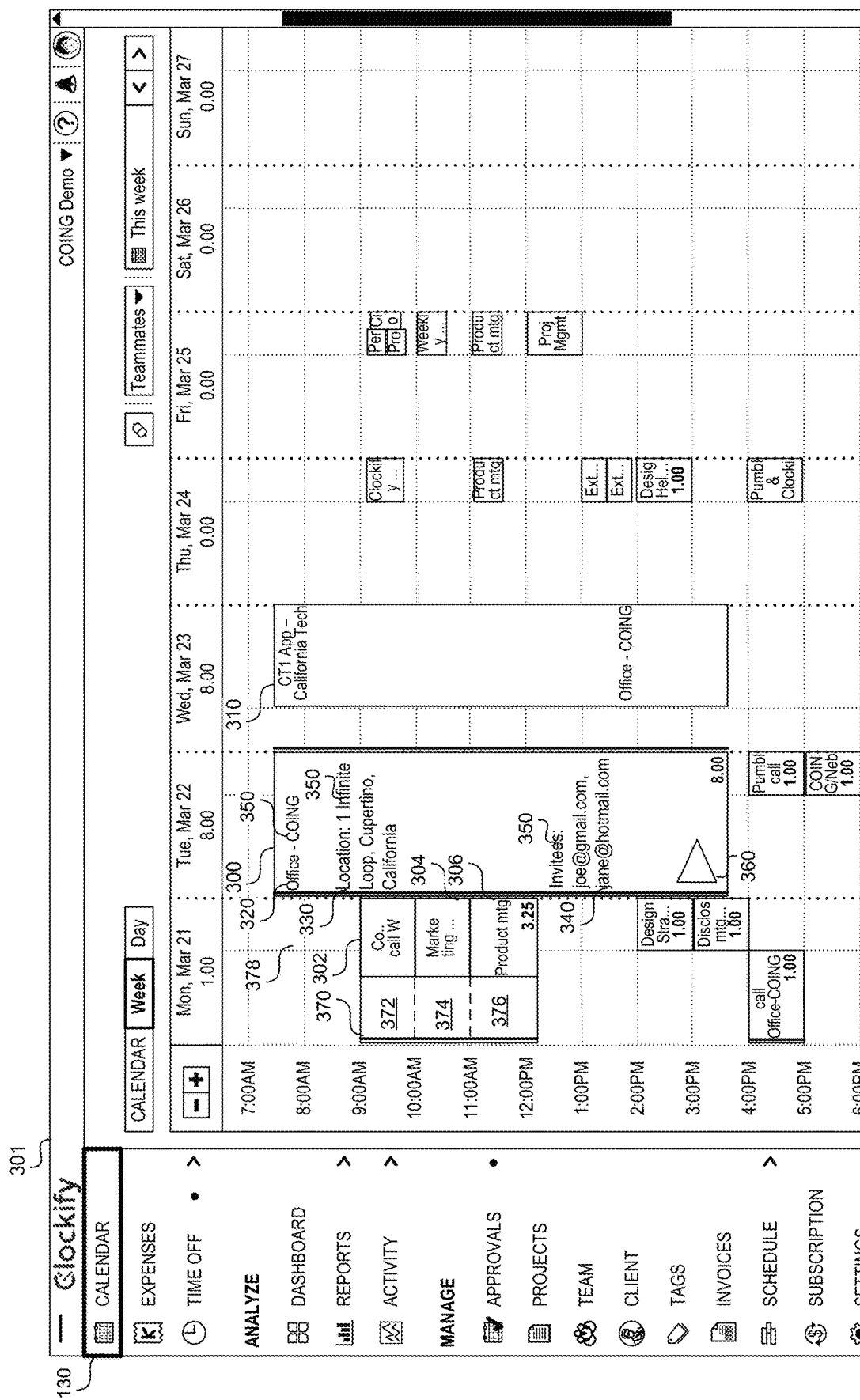
FIGS. 3B-3C show how to create a time entry based on calendar entry, according to another embodiment.
Figure 3C:
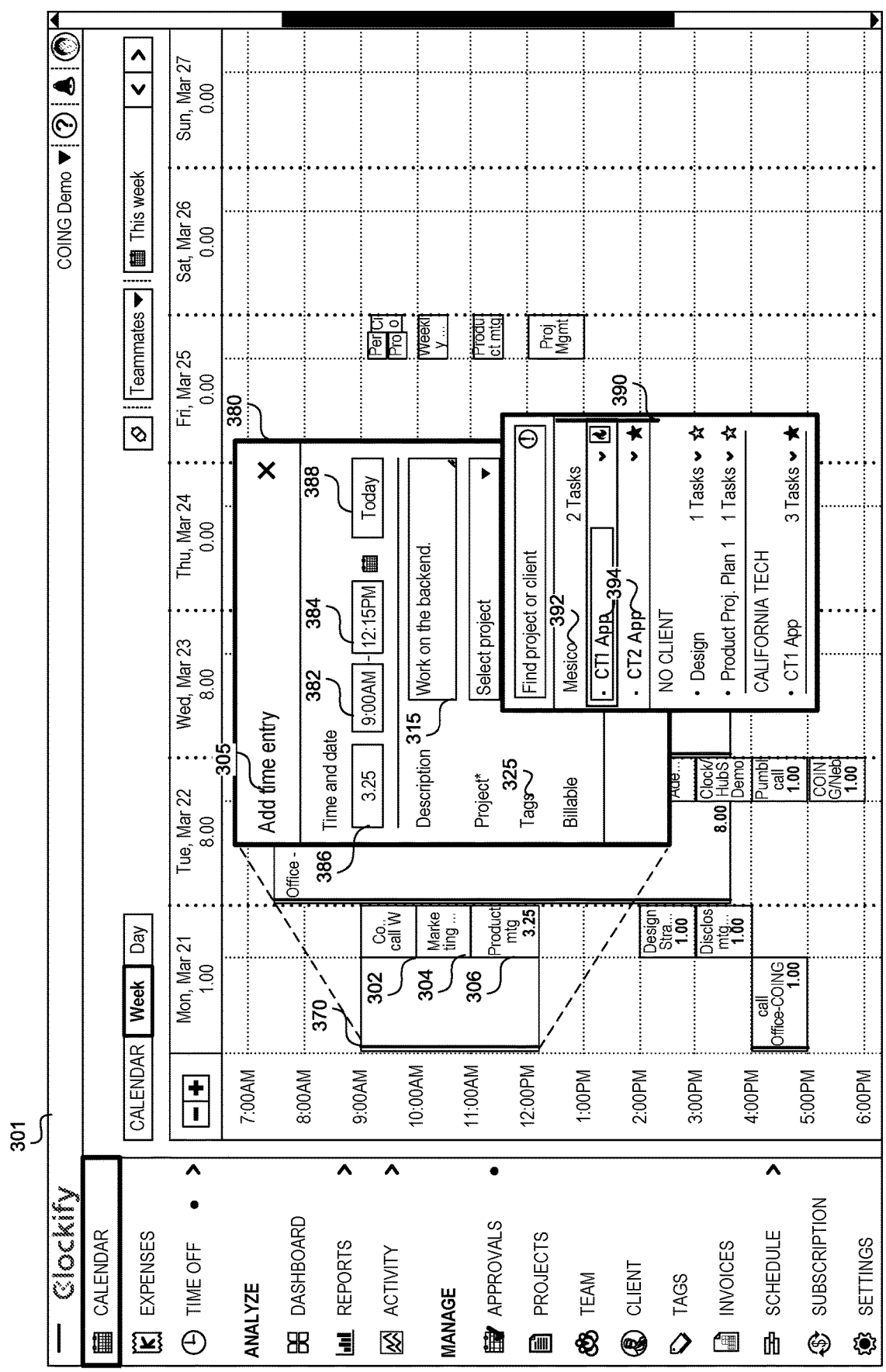

FIGS. 3B-3C show how to create a time entry based on calendar entry, according to another embodiment. The user can create a selection 370 of calendar entries 302, 304, 306. Based on the selection 370, a processor running the time-tracking software application 100 in FIG. 1 can create multiple time entries 372, 374, 376, 305. The processor can create the multiple time entries 372, 374, 376, 305 either automatically, as described in this application, or manually. Each calendar entry 302, 304, 306 can correspond to one time entry 372, 374, 376; one calendar entry can correspond to multiple time entries; or multiple time entries can correspond to a single calendar entry. In the calendar 301, the time entries 372, 374, 376 are represented to the left of the line 378, while the corresponding calendar entries 302, 304, 306 are represented to the right of the line 378.

As seen in FIG. 3C, to create the multiple time entries, the processor can present user interface 380, which includes a start time 382 and an end time 384 of the selection 370. The user interface 380 can include the duration 386 of the selection 370 and the date 388 of the selection 370. Further, the user interface can provide the list of tasks 390 associated with the selection 370. The list of tasks 390 can be ordered to initially show the most likely client 392 associated with the calendar entry 302, 304, 306. If a client has multiple tasks, and the processor cannot identify the particular task based on the information contained in calendar entries 302, 304, 306, the processor can show the client 392 and also a list of tasks 394 associated with the client. After selecting the task, the processor can create the time entry 305 based on the date 388, the duration 386, and the task.

The processor can enable the user to enter a description associated with the task, such as "work on the backend," in the user interface element 315. The processor can enable the user to create a tag in the user interface element 325. Tagging enables the user to create an additional category in addition to client, project, and/or task. For example, if the user is a full stack developer, the user can perform different kinds of work associated with a single project, such as front-end development, design, and back-end development. The granularity of the task can identify the project but may not identify the specific part of the project. The user can create the tag such as front-end development, design, or back-end development, and can tag each time entry with the appropriate tag. Based on the tag, the processor can further categorize tasks and can enable the user to search the database 105 in FIG. 1 for time entries 372, 374, 376, 305 having the appropriate tag.

Figure 4:
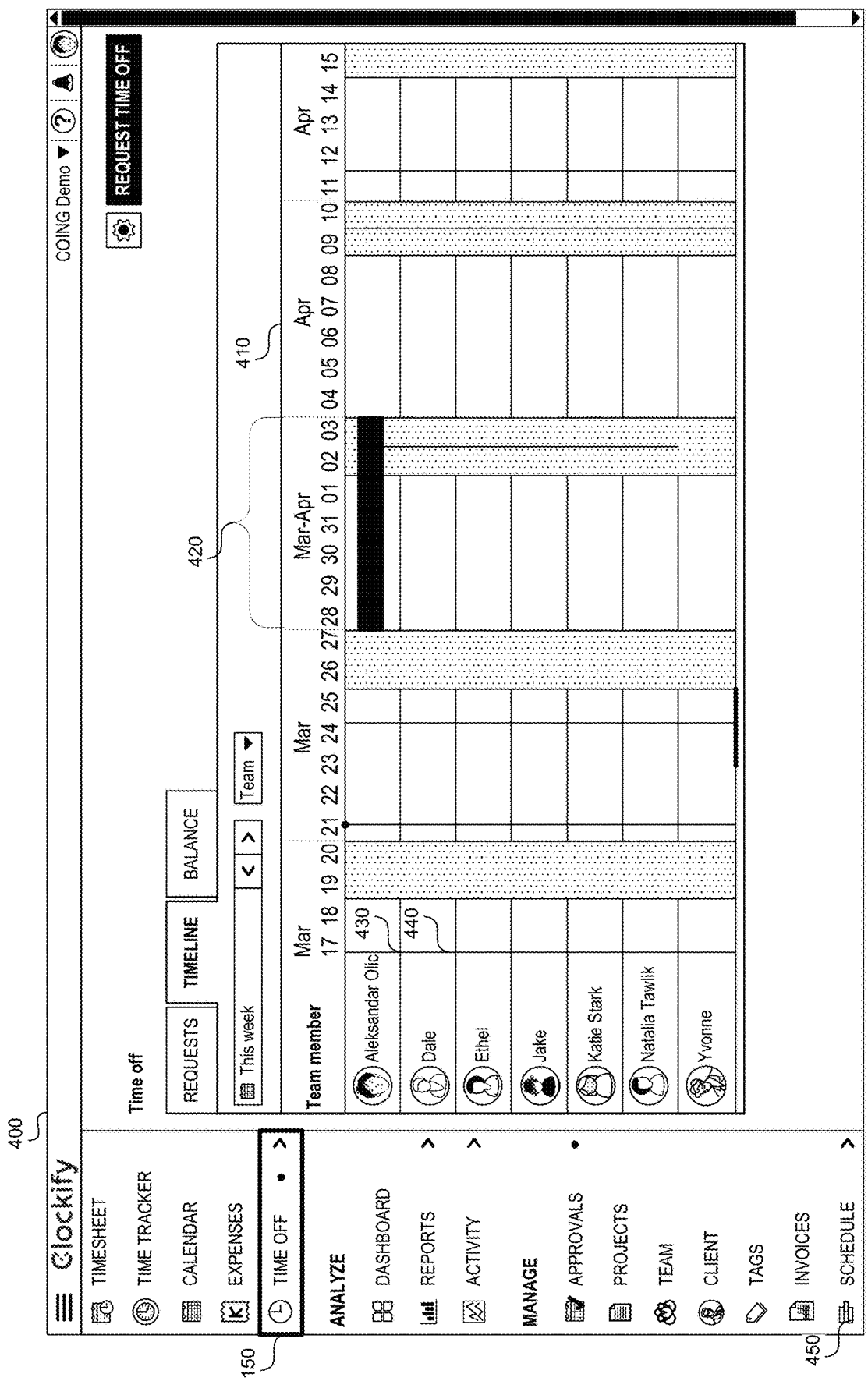
FIG. 4 shows the user interface to visualize resource availability.

FIG. 4 shows the user interface to visualize resource availability. Upon receiving a selection of the time off user element 150, the processor can present the interface 400 to the user. The interface 400 presents a visualization of a calendar 410 and dates 420 during which a resource 430, 440 (only two labeled for brevity) is not available. The resource 430, 440 can be a resource associated with the project, including a person, a computing resource, a manufacturing resource, etc. Based on the visualization of the calendar 410 and the dates 420, the user can create a schedule through the schedule user interface element 450.

Figure 5:
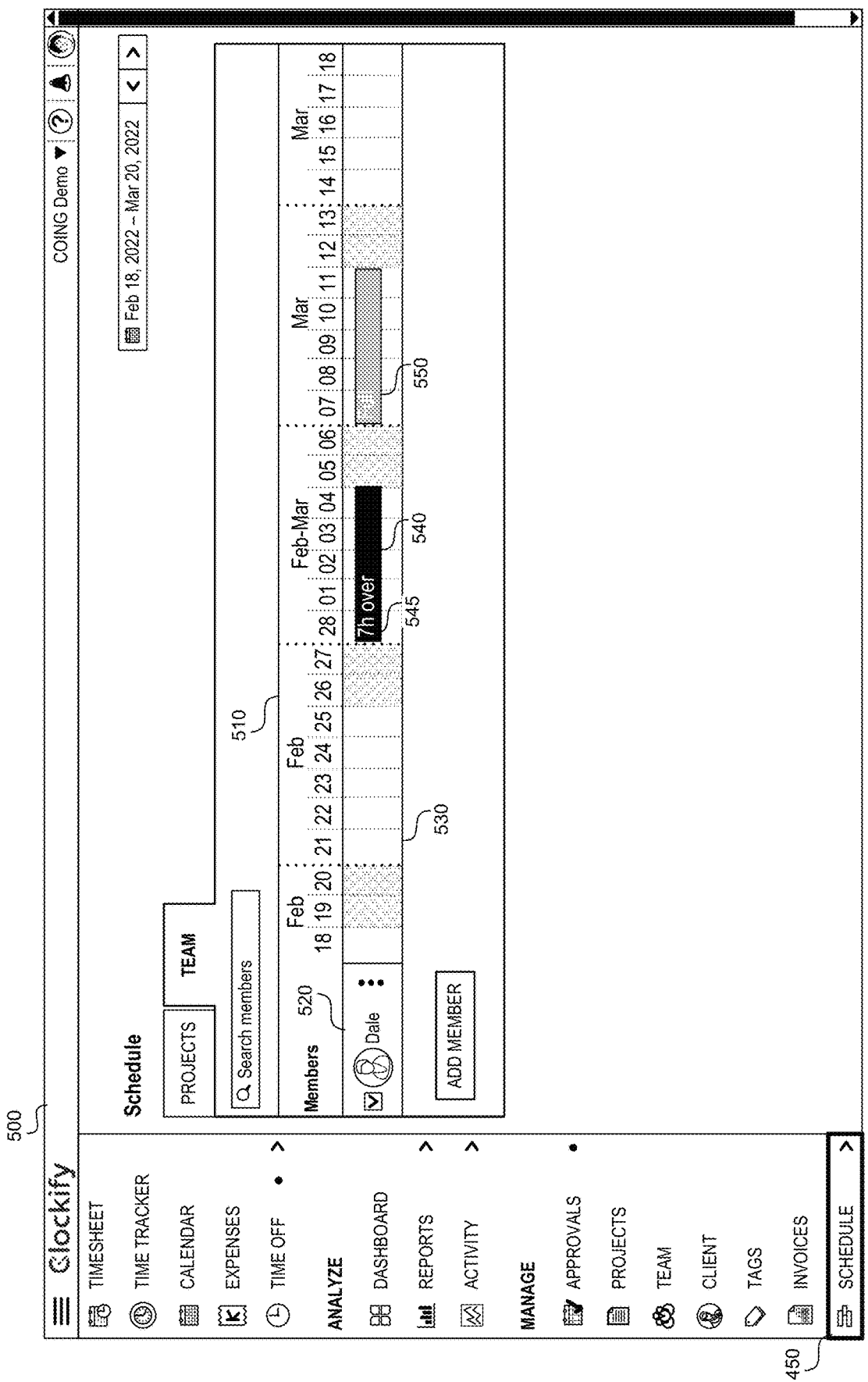
FIG. 5 shows the user interface to staff a project.

FIG. 5 shows the user interface to staff a project. Upon receiving a selection of the schedule user interface element 450, the processor can present the interface 500 to the user. The interface 500 presents a visualization of a calendar 510, a resource 520, and a visualization 530, 540, 550 of the availability of the resource. The visualization 530, indicating blank dates, shows that the resource 520 is available during the blank dates. The visualization 540 can be color-coded, e.g., in red, to show that the resource 520 is working more than full capacity, such as more than eight hours a day, and can indicate the amount 545 by which the resource 520 is working overtime. The visualization 550 can be color-coded, e.g., in green, to show that the resource 520 is working at full capacity.

Figure 6:
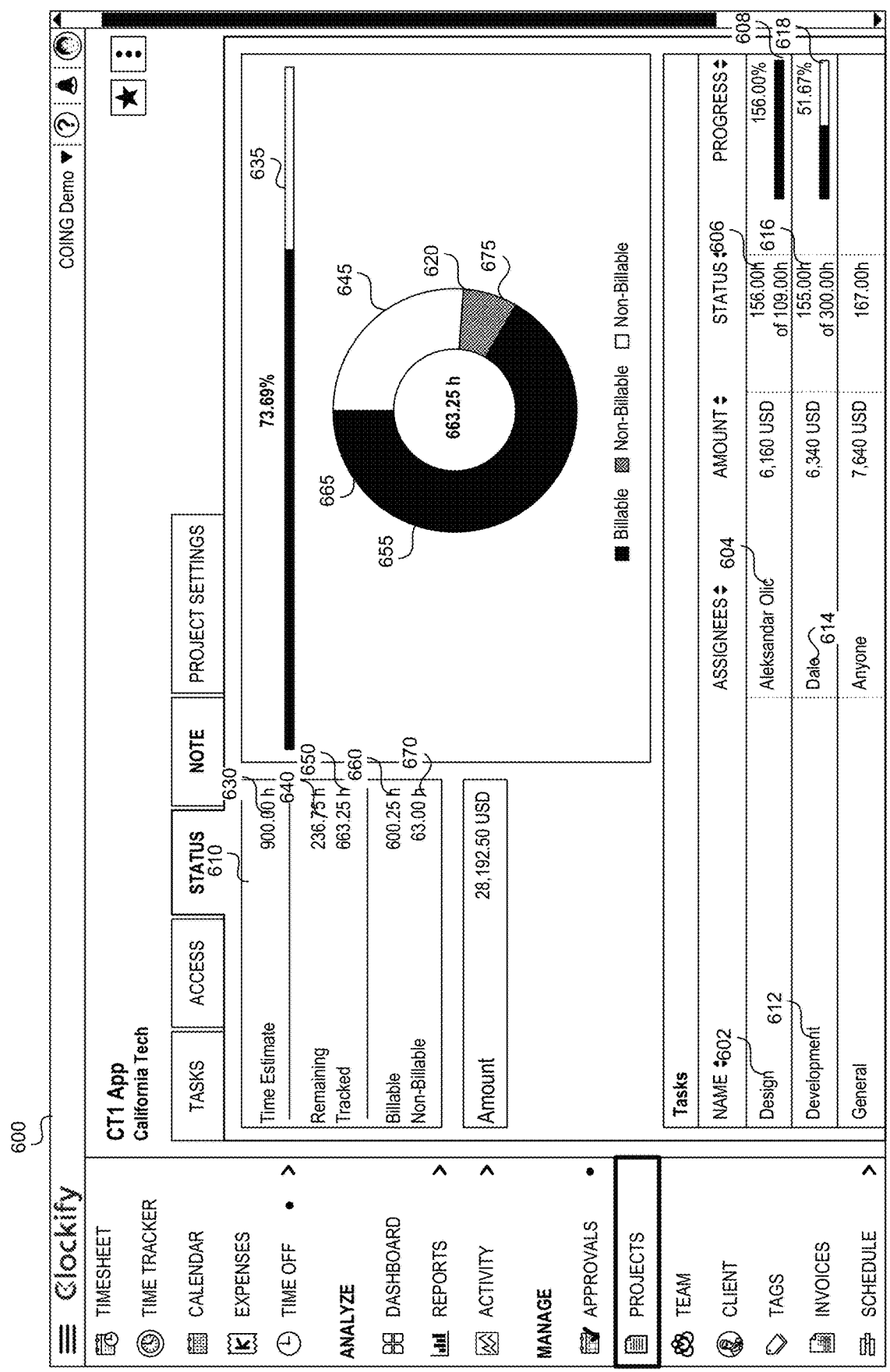
FIG. 6 shows the user interface to staff and track the progress of a project.

FIG. 6 shows the user interface to staff and track the progress of a project. The user interface 600 can present information about the project textually 610, or visually 620, such as estimated time to complete the project 630, 635, time remaining in the project 640, 645, tracked time 650, 655, billable time 660, 665, nonbillable time 670, 675, etc.

In addition, the user interface 600 can present the tasks 602, 612, the people 604, 614 assigned to the tasks, how much time 606, 616 each person spent on the task, and what percentage 608, 618 of the total amount of time allocated to each person for each task has been spent. The percentage 608 can be color-coded, e.g., in red, to indicate that the person 604 has spent more time than allocated on the task 602. The percentage 618 can be color-coded, e.g., in green, to indicate that the person 614 has spent less time than allocated on the task 612. Once the task is completed, the percentage 608, 618 can indicate the total amount of time that the person 604, 614 needed to complete the task 602, 612.

Based on the percentage 608, 618, the processor can determine the velocity of a person 604, 614. The velocity can indicate how quickly the person 604, 614 is doing the task. Based on the velocity, the processor can determine the best people suited to particular tasks and can store this information in the database 105 in FIG. 1. The next time that a new task needs to be staffed, the processor can determine the best person 604, 614 for the new task based on the information stored in the database 105, such as a person's velocity and a person's availability. In addition to people 604, 614, the processor can assign other resources to the task based on the resource efficiency in completing the task.

Figure 7A:
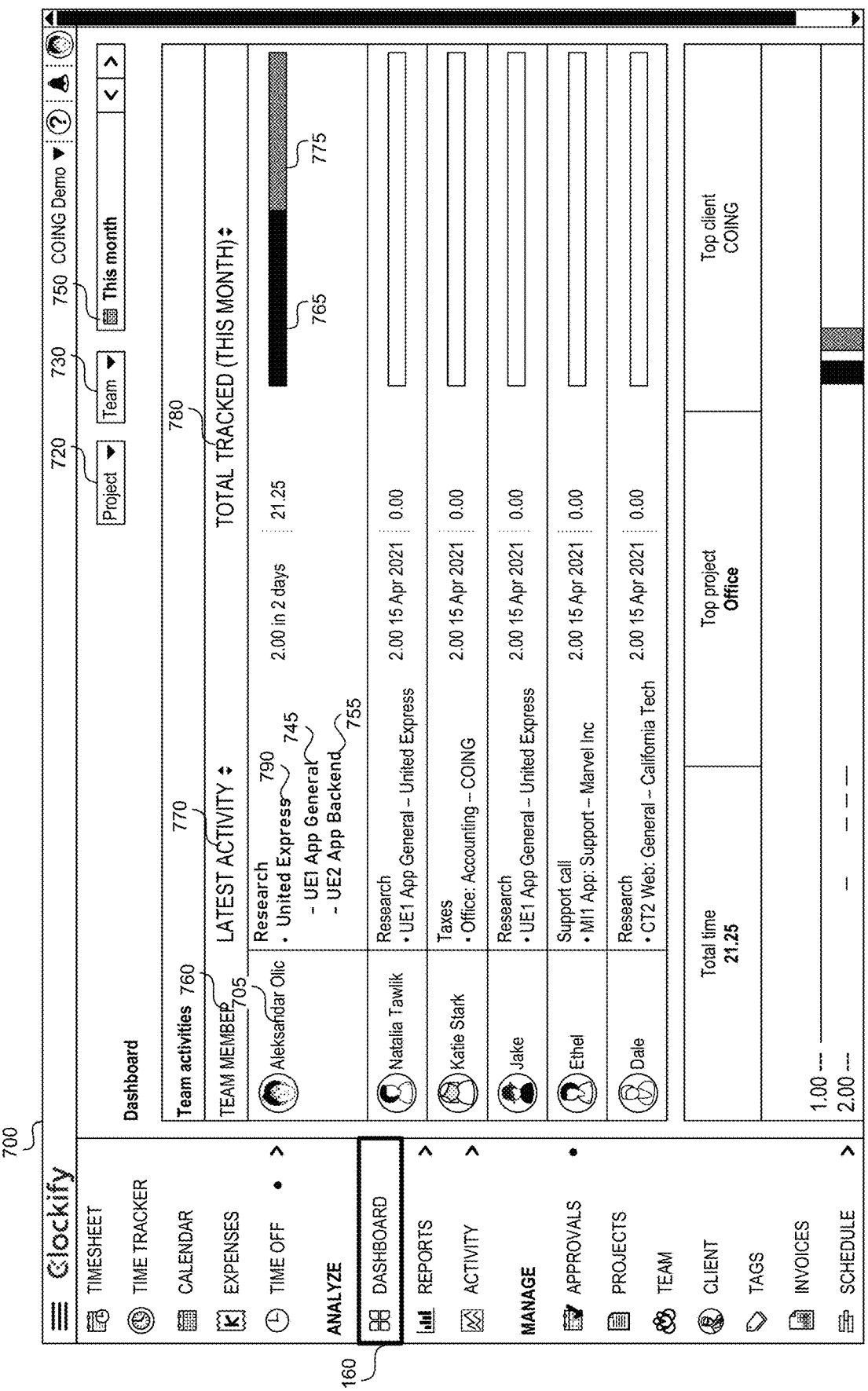
FIGS. 7A-7B show how to monitor progress of the project.
Figure 7B:
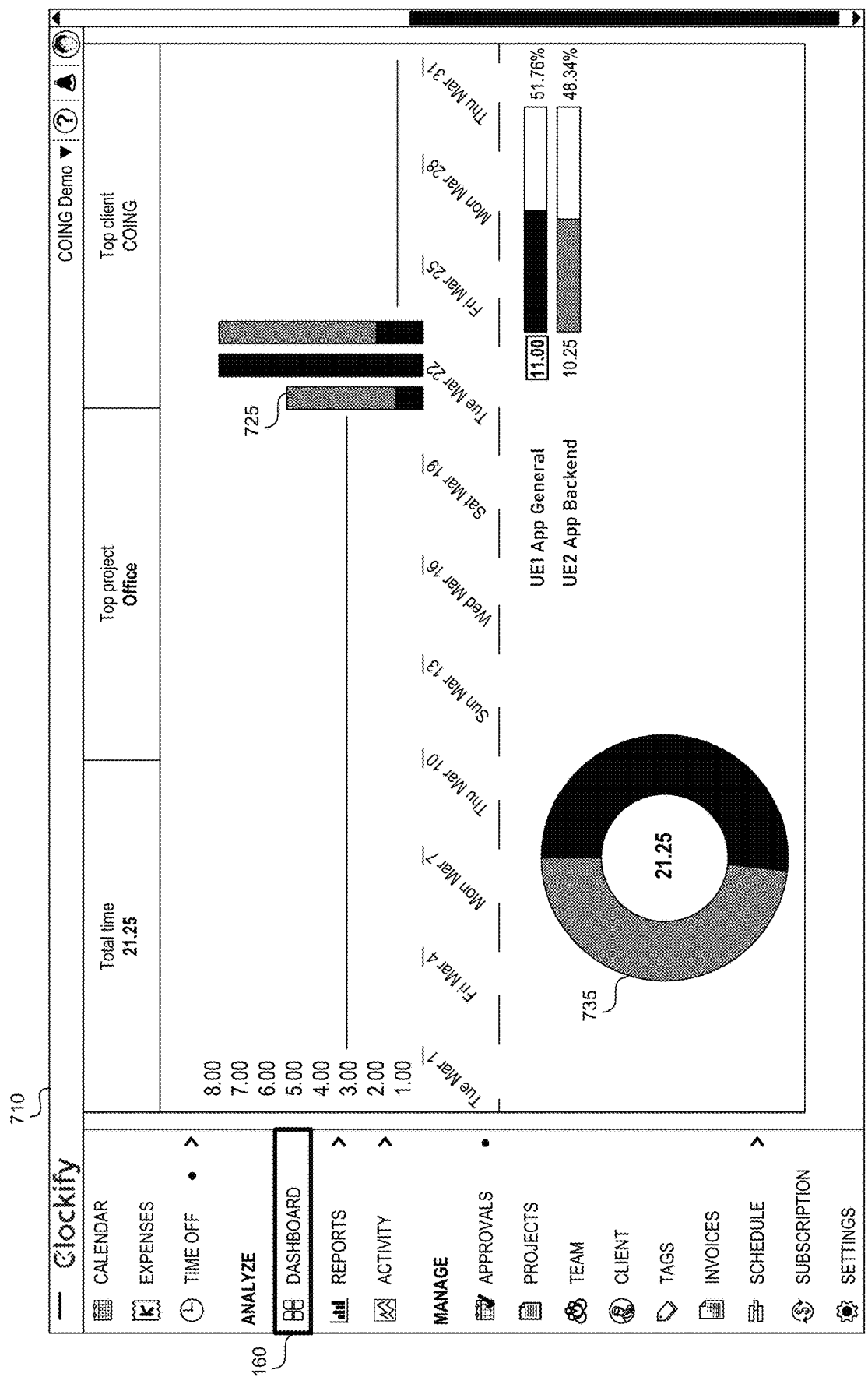
Figure 8A:
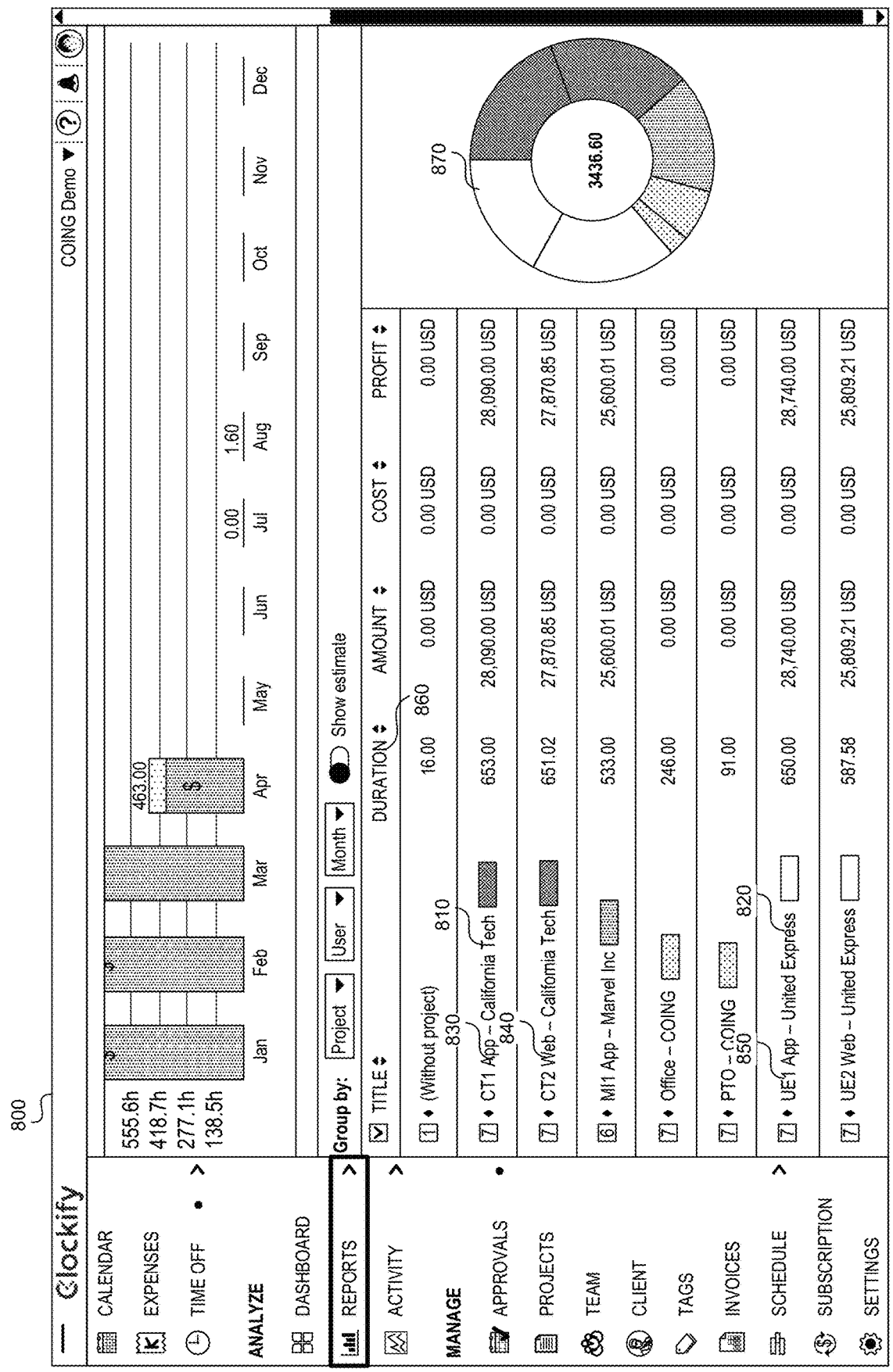
Figure 8B:
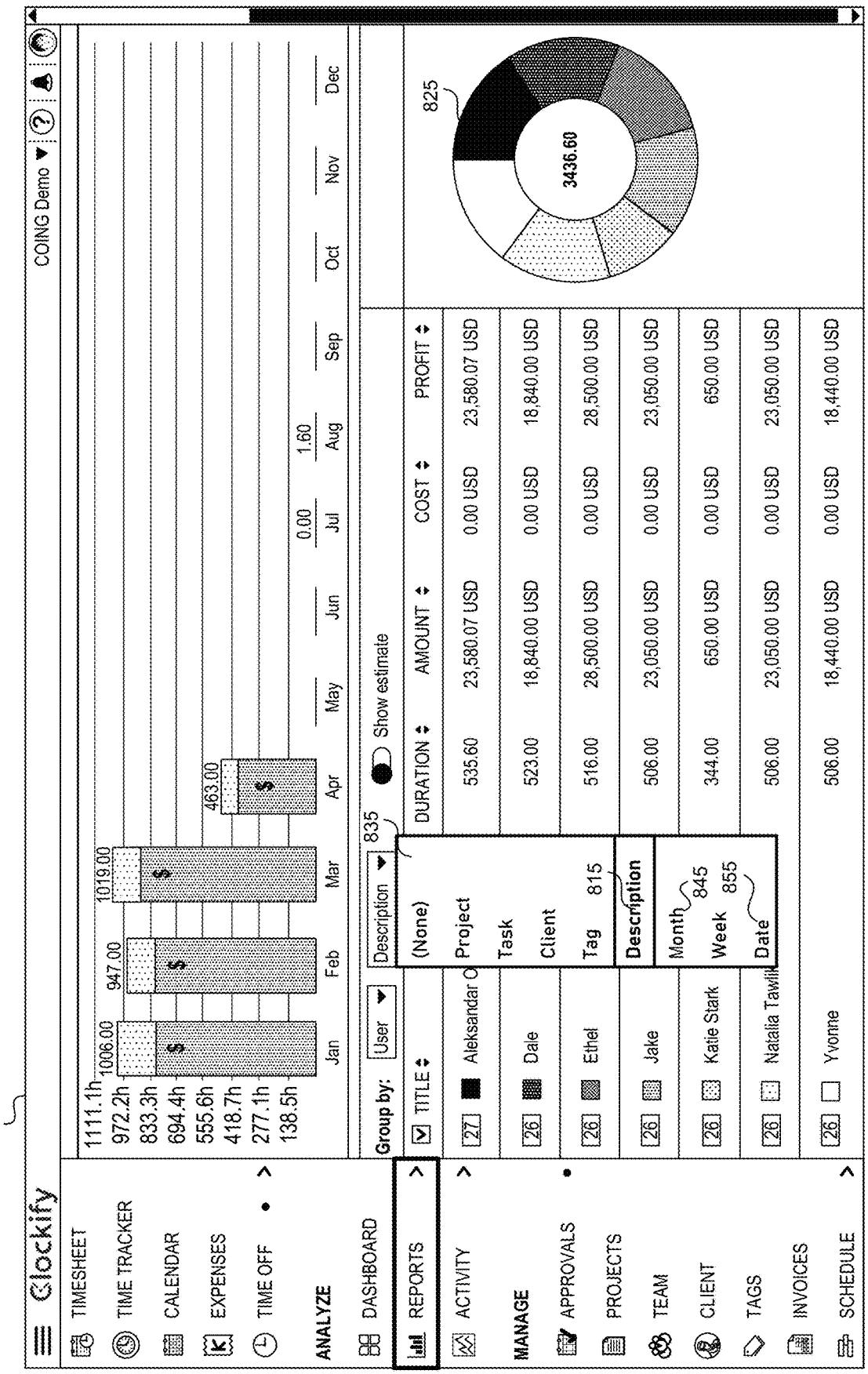
Figure 8D:
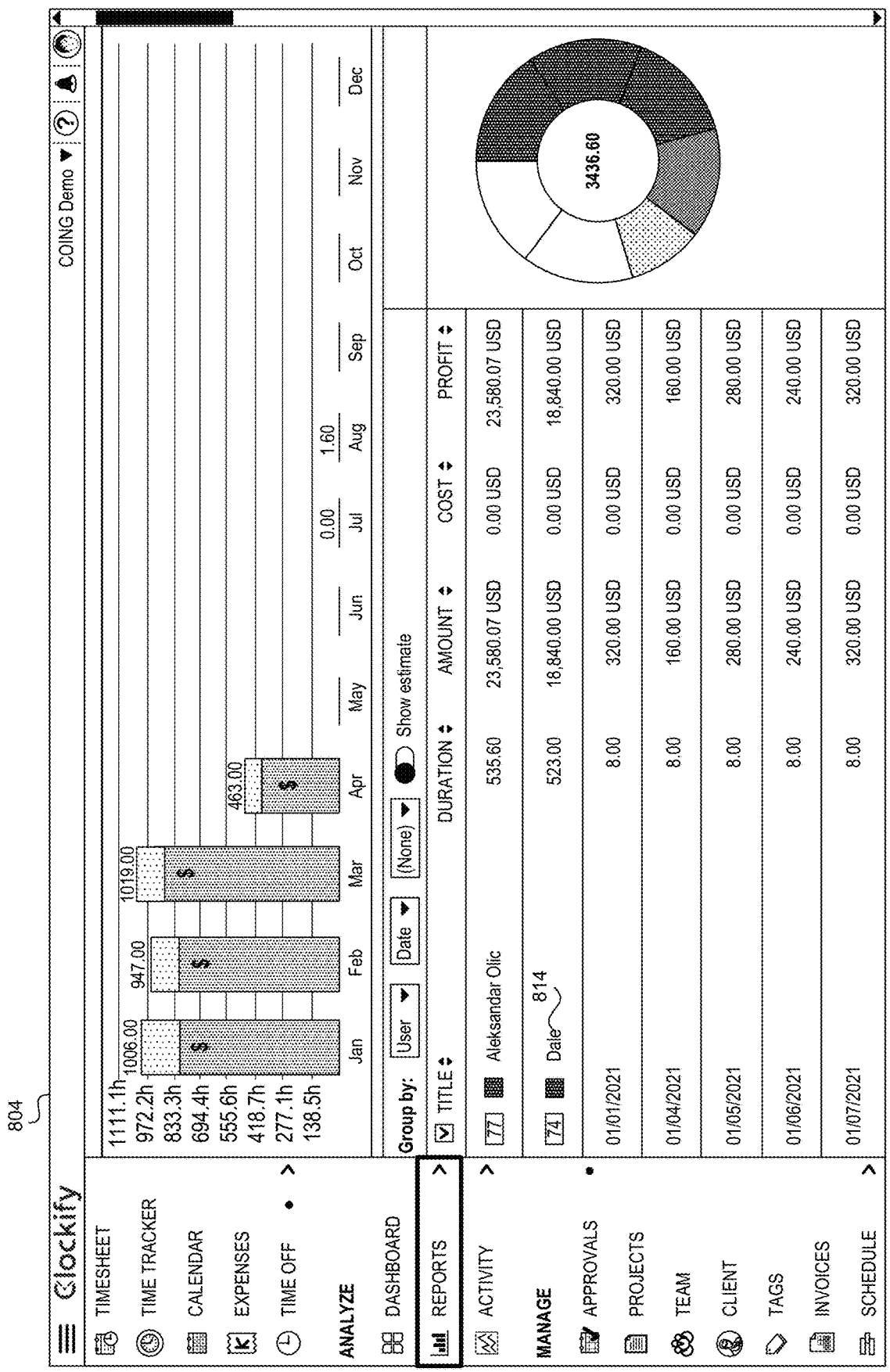

FIGS. 7A-7B show how to monitor progress of the project. Upon receiving a selection for the dashboard user interface element 160, the processor can present user interface 700, 710 to the user, which enables the user to track the progress of the project. The user interface 700 (FIG. 7A) can receive an indication of the project 720 and/or a team 730 during a particular time period 750. Based on the project 720, team 730, and time period 750, the user interface 700 can present a visualization of the team members 760, their corresponding projects 770, and the amount of time 780 spent on the project 720. For example, team member 705 has spent 21.25 hours on the project 720. The different visualizations 765, 775 can indicate the various tasks 745, 755 associated with the project 790.

The user can select a team member 705. Upon receiving selection of the team member 705, the user interface 710 (FIG. 7B) can show a visualization 725, 735 indicating how much time the selected member 705 spent in various tasks 745, 755. Based on the various visualizations described in this application, the processor can determine productivity of each resource, such as a person, a machine, etc.

FIGS. 8A-8D show various generated reports associated with the project. User interface 800 (FIG. 8A) shows various clients 810, 820 (only two labeled for brevity), and their corresponding projects 830, 840, 850 (only three labeled for brevity). A single client 810, 820 can have one or more projects 830, 840, 850, and each project can have one or more tasks. Column 860 and the visualization 870 show the amount of time spent on each project 830, 840, 850. The visualization 870 can be color-coded so that the color of the visualization matches the color of the project 830, 840, 850.

User interface 805 (FIG. 8B) shows the users working on tasks having the same description 815. User interface 805 provides an overview of the most efficient workers for a particular task. User interface element 825 shows a pie chart comparison of productivity, where the largest pie slice indicates the greatest amount of time spent on the task. User interface element 835 enables the user to switch to a different visualization, such as switching from description 815 to month visualization 845 or date visualization 855.

User interface 802 (FIG. 8C) shows month visualization 845, indicating the productivity of person 812 over the previous months. User interface 804 (FIG. 8D) shows date visualization 855, indicating the productivity of person 814 over the previous days.

Figure 9A:
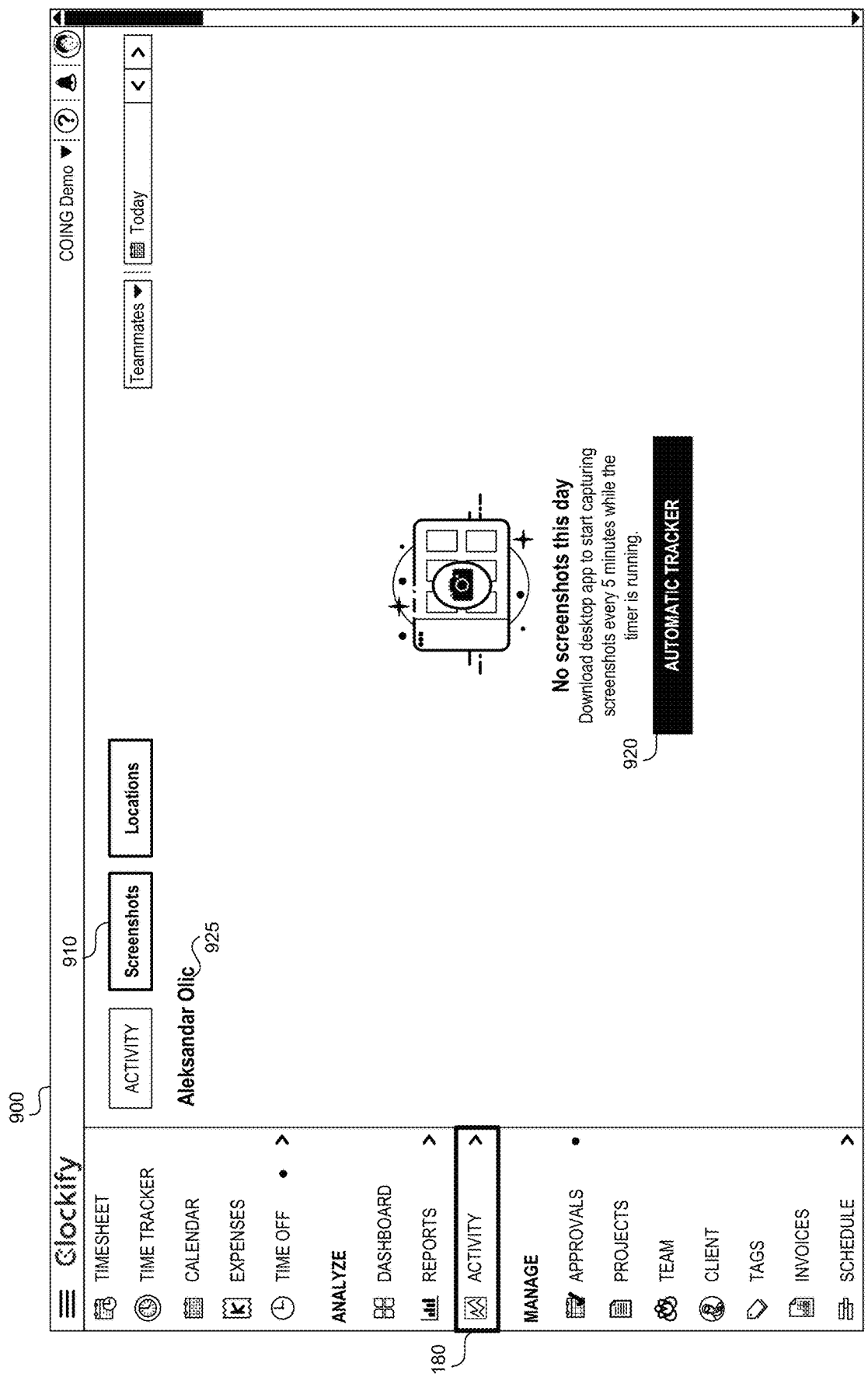
FIGS. 9A-9B show an automatic tracker.
Figure 9B:
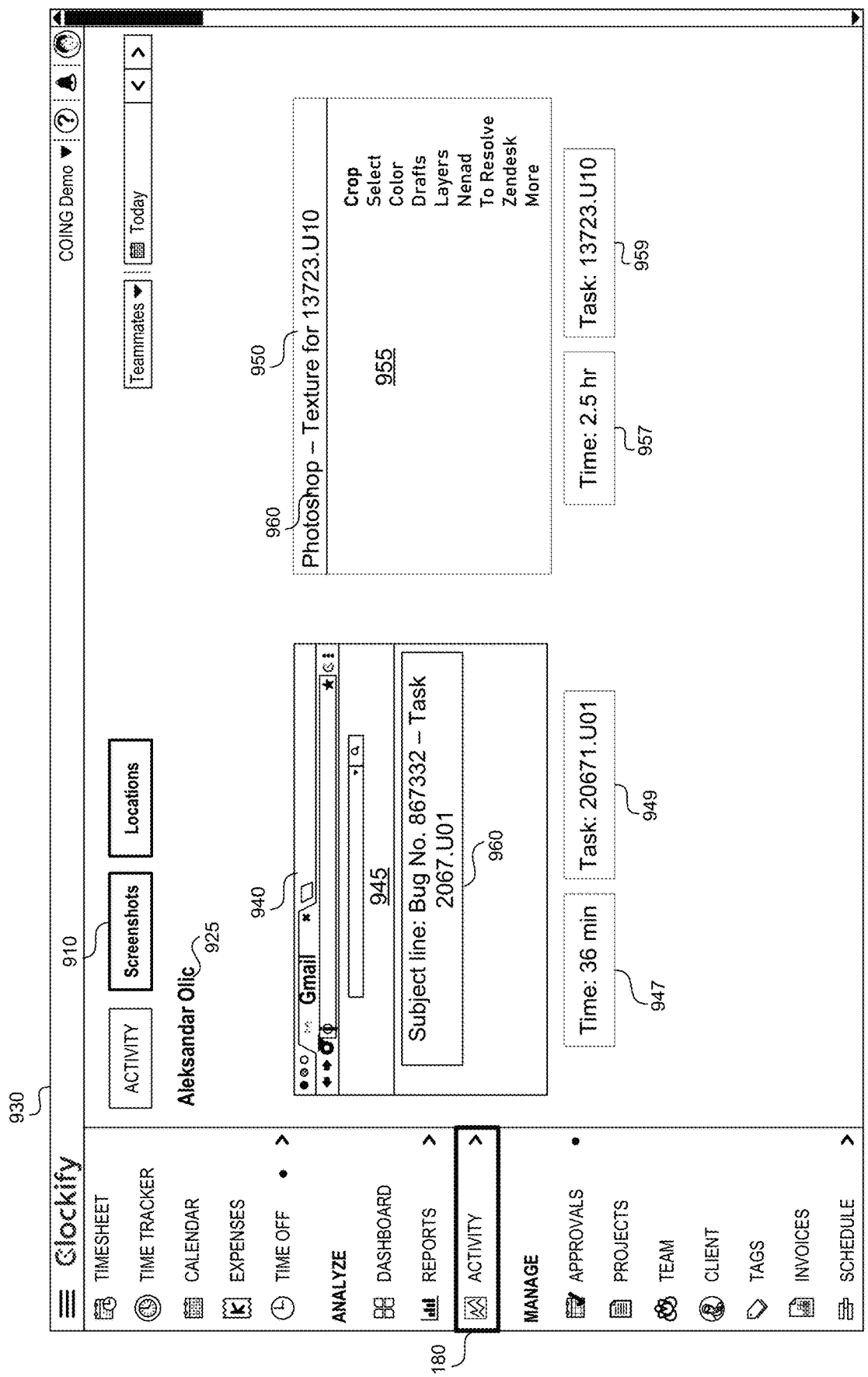

FIGS. 9A-9B show an automatic tracker. Upon receiving a selection of the activity user element 180, the processor can present the user interface 900 (FIG. 9A) to the user. The user interface 900 can include a user interface element 910 to activate an automatic tracker 920 for the user 925. The automatic tracker 920 can monitor the user's activity at a predetermined time interval, such as every five minutes, and can make a recording of the user's screen. The automatic tracker 920 can operate while a timer 360 in FIG. 3A is running.

Upon receiving user input indicating to show the recorded activity, the automatic tracker 920 can present the user interface 930 in FIG. 9B. The user interface 930 can include multiple recordings 940, 950 of the user's screen over a predetermined period of time, such as the beginning of the workday.

The multiple recordings 940, 950 are different from each other and can include still images, time-lapse videos, or short videos of the user's screen. The multiple recordings 940, 950 can include user interfaces 945, 955 of the different software with which the user was interacting. Each recording can represent a particular software application, such as Gmail in recording 940 and Photoshop in recording 950, or each recording can represent the same software application but a different task performed in the same software application.

The processor can present the amount of time 947, 957 spent in each user interface 945, 955. In addition, the processor can automatically determine the task 949, 959 associated with each recording using an identifier 960, as described in this application. The identifier 960 can be the name of the file opened in the user interface 945, 955. From the identifier 960, the processor can extract the unique identifier of the task as described in this application. The processor can present the task 949, 959 associated with each user interface 945, 955. The amount of time 947, 957 and the task 949, 959 can be user-editable.

To select the multiple recordings 940, 950 to show to the user from many more snapshots of the user screen, the processor can group the multiple snapshots of the user screen by the user interfaces 945, 955 seen in the screen snapshot. For example, if the user spends one hour in Photoshop, half an hour in Gmail, and then 45 minutes in Photoshop, the user interface 930 can show in recording 940 that Photoshop has been used for one hour 45 minutes and can show in recording 950 that Gmail has been used for half an hour.

To select the multiple recordings 940, 950 to show to the user from many more snapshots of the user screen, the processor can group the multiple snapshots of the user screen by the task 949, 959 shown in the user interfaces 945, 955 seen in the screen snapshot. The processor can determine the task 949, 959 using various identifiers 960 such as title of the file, subject line of an email, metadata associated with the user interfaces 945, 955, location, invitees to a meeting, header or footer of a file in the user interface, etc.

Figure 10:
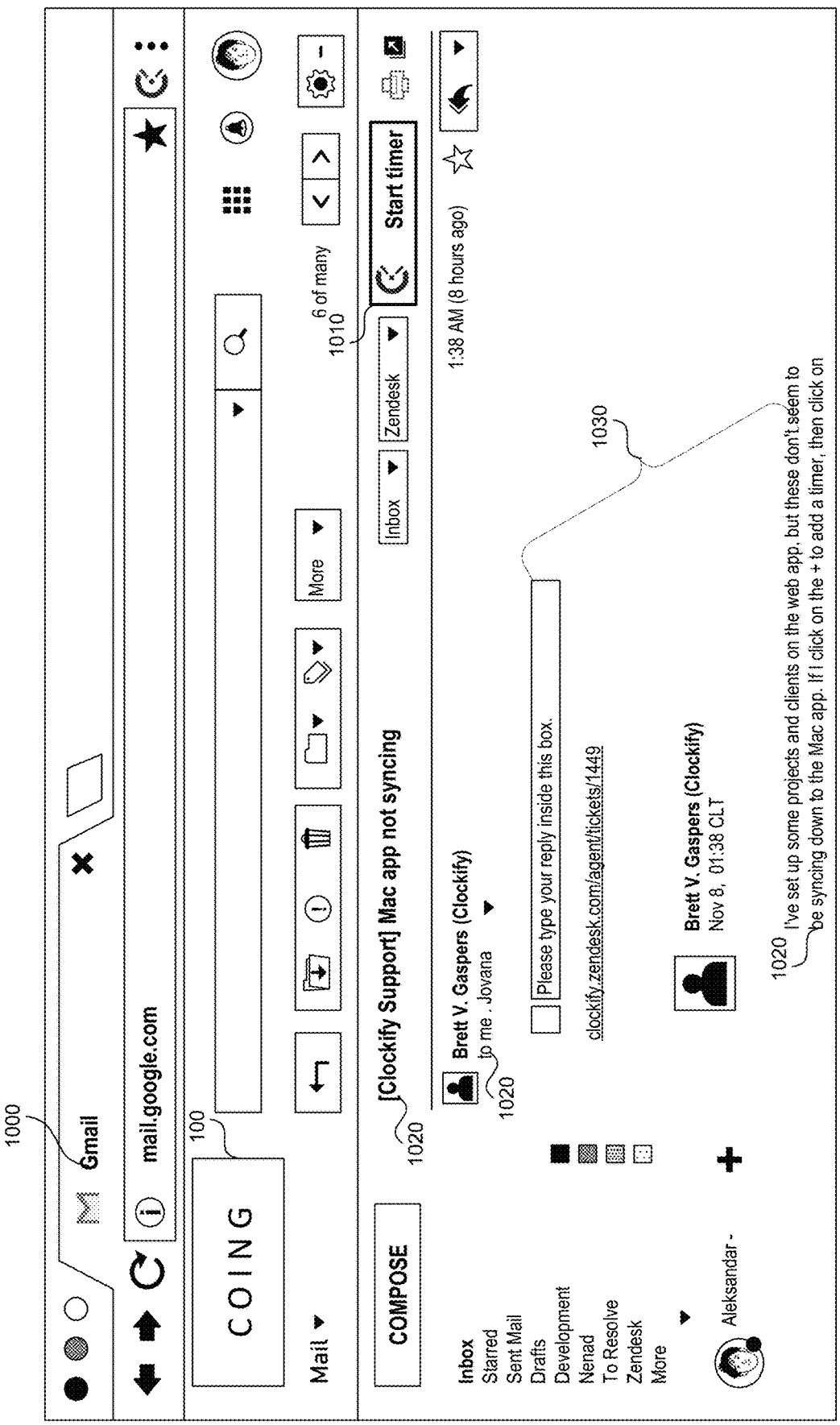
FIG. 10 shows an integration of the time-tracking software application with a different platform.

FIG. 10 shows an integration of the time-tracking software application 100 with a different platform 1000. The different platform 1000 can be a different software application such as Gmail (as shown in FIG. 10), any of the programs in the Microsoft office suite, any Adobe program such as Photoshop, any of the Autodesk programs, etc. The processor running the time-tracking software application 100 can provide a user interface element 1010 within the different platform 1000, which can enable the user to start and stop a timer. When the user selects the user interface element 1010, the processor can create a start time, and when the user interface element 1010 is toggled, the processor can create an end time. The processor can create a time entry in the time-tracking software application 100 based on the difference between the end time and the start time.

The processor can determine the task associated with the time-tracking software application 100 based on various identifiers 1020, as described in this application. For example, the identifier 1020 can be the title of the email, the list of email recipients, or contents of the email. The processor can analyze the contents of the email 1030 to identify a word that uniquely identifies a task in the database 105 in FIG. 1.

Figure 11A:
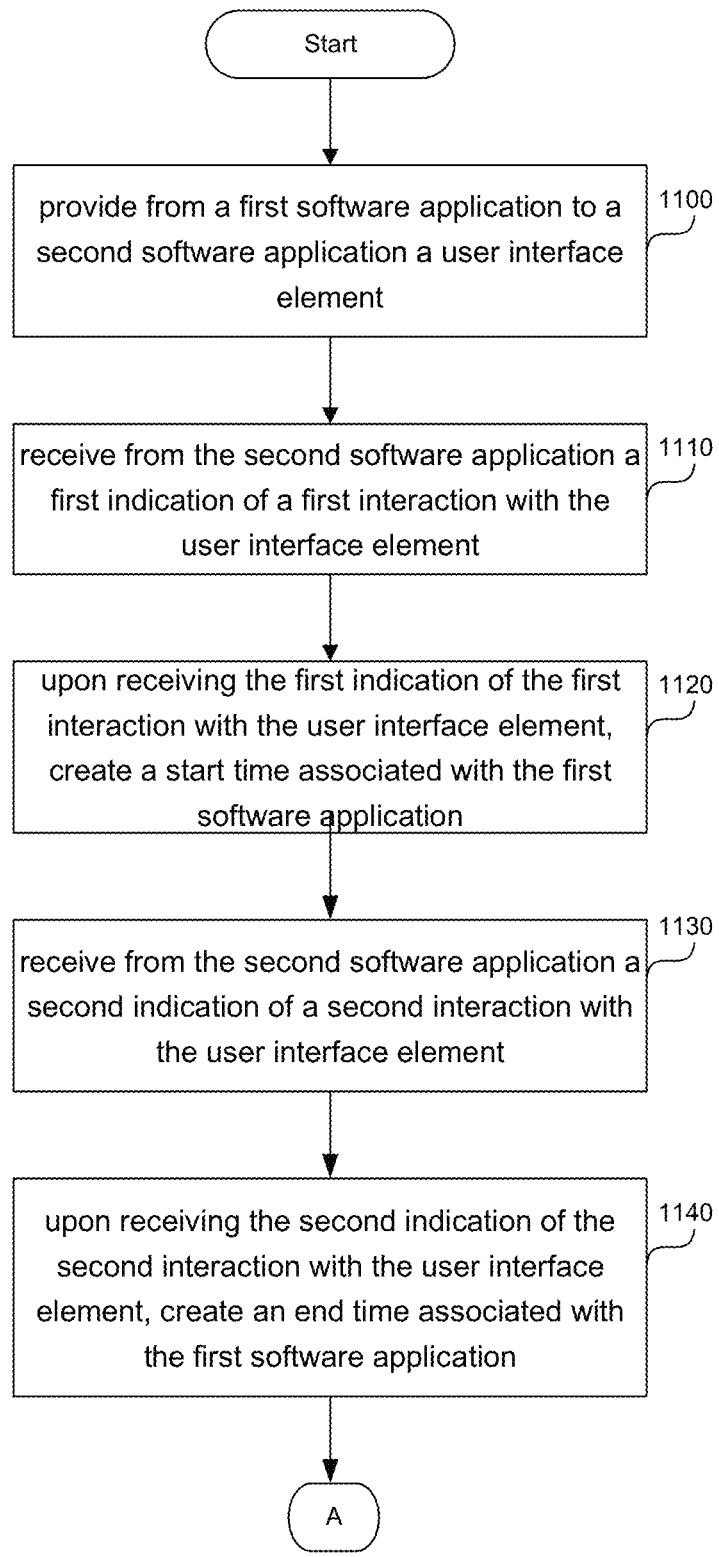
FIGS. 11A-11B are a flowchart of a method to automatically create a time entry.
Figure 11B:
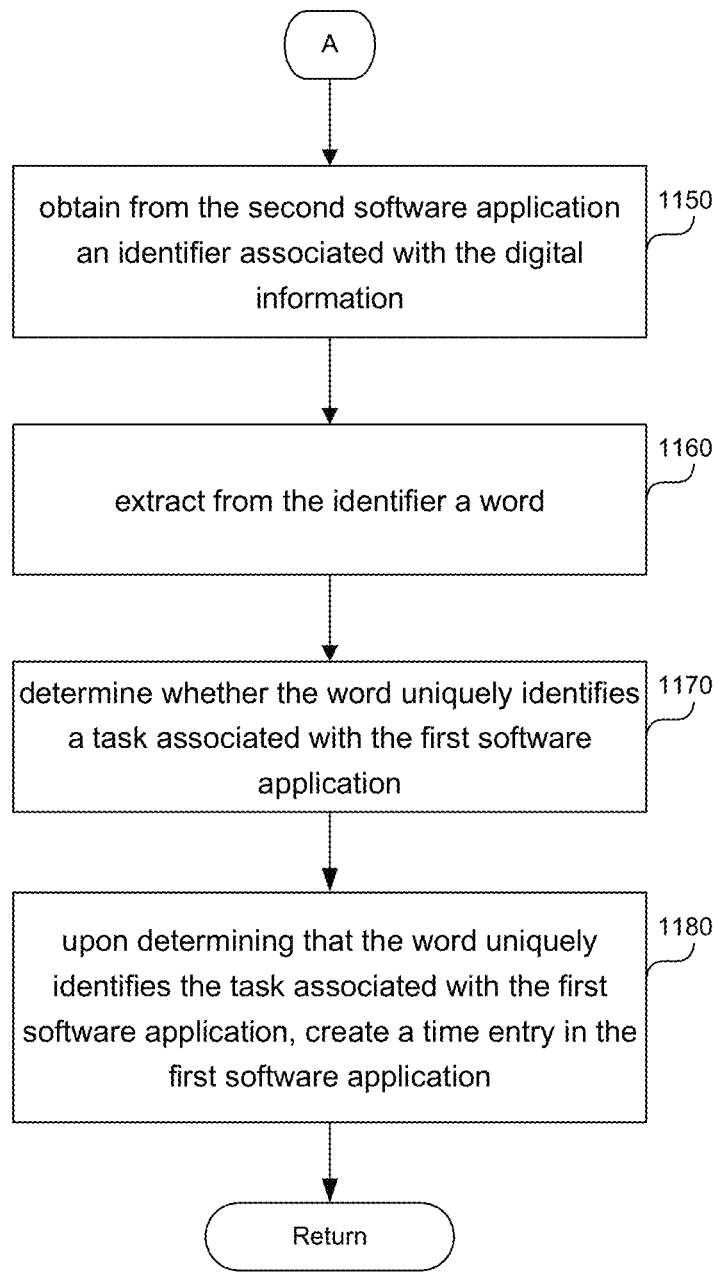

FIGS. 11A-11B are a flowchart of a method to automatically create a time entry. A hardware or software processor executing instructions described this application, in step 1100, can provide from a first software application to a second software application a user interface element, where the user interface element can be interactive and presented to a user. The first software application can be a time-tracking software application. The second software application can enable the user to interact with digital information, such as a file. The file can be an email, a record in a database, an image, a video, etc.

In step 1110, the processor can receive from the second software application a first indication of a first interaction with the user interface element, such as a selection of a timer button. In step 1120, upon receiving the first indication of the first interaction with the user interface element, the processor can start a timer and create a start time associated with the first software application.

In step 1130, the processor can receive from the second software application a second indication of a second interaction with the user interface element, such as toggling of the time button. In step 1140, upon receiving the second indication of the second interaction with the user interface element, the processor can stop the timer and create an end time associated with the first software application.

In step 1150, the processor can obtain from the second software application an identifier associated with the digital information, where the identifier uniquely identifies the digital information. The identifier can be the title of the file, subject line of the email, metadata associated with the digital information, content associated with the digital information, identifier associated with the digital information, meeting attendees, email recipients, email sender, location associated with the digital information, location associated with the user, etc.

In step 1160, the processor can extract from the identifier a word. A word includes one or more alphanumeric characters and is delineated by a delimiting character, such as a " ", "/", ".", ":", "-", etc.

In step 1170, the processor can determine whether the word uniquely identifies a task associated with the first software application. In step 1180, upon determining that the word uniquely identifies the task associated with the first software application, the processor can create a time entry in the first software application based on a difference between the start time and the end time. In some embodiments, the processor can combine one or more words to uniquely identify the task, as described below. In addition, the processor can create a description of the task based on the identifier. For example, the description can state "working on <title of the digital information>."

The processor can combine multiple words to identify the task. The processor can obtain from the first software application a hierarchical identification of the task, where the hierarchical identification uniquely identifies the task. The hierarchical identification includes a first level identifier and a second level identifier. The first level identifier can be a client's ID, while the second level identifier can be the task associated with the client. The first level identifier can include multiple second level identifiers. Upon determining that the word does not uniquely identify the task, the processor can determine whether the word uniquely identifies the first level identifier. Upon determining that the word uniquely identifies the first level identifier, the processor can iteratively perform the following two steps until determining that the second word uniquely identifies the second level identifier associated with the first level identifier. First, the processor can obtain a second word from the identifier associated with the digital information, where the word and the second word are different. Second, the processor can determine whether the second word uniquely identifies the second level identifier associated with the first level identifier. Upon determining that the second word uniquely identifies a second level identifier associated with the first level identifier, the processor can create the time entry in the first software application based on the difference between the start time and the end time.

The processor can identify the task based on the directory path or file path associated with the file. The processor can obtain from the first software application a hierarchical identification of the task, where the hierarchical identification includes a first level identifier and a second level identifier, and where the hierarchical identification uniquely identifies the task. The first level identifier can include multiple second level identifiers. The processor can obtain from the second software application the identifier associated with the digital information. The identifier can include a directory or file path associated with the digital information. The processor can extract from the file path one or more words delineated by a file path delimiting character, such as a slash ("/"), a backslash ("\"), or a colon (":"). The processor can determine whether the word uniquely identifies the task. Upon determining that the word does not uniquely identify the task in the database, the processor can determine whether the word identifies a subset of tasks among the multiple tasks. Upon determining that the word identifies the subset of tasks, the processor can obtain a second word associated with the file path. The processor can determine whether the second word uniquely identifies the task among the subset of tasks. Upon determining that the second word uniquely identifies the task among the subset of tasks, the processor can create a time entry.

The processor can determine the task based on a name associated with the digital information. The processor can obtain from the second software application a name associated with the digital information. The name can be the name of the file, the subject line of the email, the file path, etc. The processor can extract from the name associated with the digital information the word delineated by the delimiting character, such as a space. The word can include a number because task identifiers usually include a number to be able to distinguish and order a multitude of tasks.

The processor can estimate an amount of time needed for a task based on the task complexity. The processor can obtain from the second software application the identifier of the digital information that has changed between the start time and the end time. The processor can obtain from the second software application a first version of the digital information and a second version of the digital information. The first version of the digital information can indicate contents of the digital information prior to the start time, and the second version of the digital information can indicate contents of the digital information after the end time. The processor can determine a difference between the first version of the digital information and the second version of the digital information. The difference can be the number of lines of changed code or the number of lines of changed text. The processor can obtain a baseline estimate indicating an amount of time needed to create the difference. The baseline estimate can indicate a rate of change, such as number of changes per unit time. Specifically, the baseline estimate can indicate that changing 10 lines of code usually takes 1 hour or that changing 2 pages of text usually takes 1 hour. The processor can create the time entry in the first software application based on the baseline estimate and the difference between the start time and the end time. The time entry created by the software may not be greater than the difference between the start time and the end time.

The processor can remind the user to start the timer if the user is working. The processor can determine whether the user is interacting with the second software application. The processor can determine whether the first software application received the first indication of the first interaction. Upon determining that the user is interacting with the second software application and that the first software application has not received the first indication of the first interaction, the processor can provide a reminder to the user to interact with the user interface element.

The processor can determine multiple velocities associated with multiple users based on multiple time entries associated with the multiple users. A velocity among multiple velocities can indicate an amount of time for a user among the multiple users to perform a first task. Based on the multiple velocities associated with the multiple users, the processor can determine multiple baseline estimates indicating multiple amounts of times for the multiple users to perform a second task, where the first task and the second task are different. The processor can use the baseline estimates to create a time entry as explained above, where the baseline estimate can be specific to the user. The processor can obtain a project timeline and multiple availabilities associated with the multiple users. The availabilities can include vacation time and/or workload. Based on the multiple velocities associated with the multiple users, the project timeline, and the multiple availabilities associated with the multiple users, the processor can suggest a user among the multiple users for the second task. Specifically, the processor can help in planning out projects by estimating a user's velocity in performing and completing the task. The velocity changes between users. The processor can take workload and vacation time into account when planning out projects. The user can include a resource such as a person, a computing resource, a manufacturing resource, etc.

The processor can determine a velocity associated with a user based on multiple time entries associated with the user, where a velocity indicates an amount of time for the user to perform a first task. Based on the velocity associated with the user, the processor can determine a baseline estimate indicating an amount of time for the user to perform a second task, where the first task and the second task are different. The processor can create the time entry based on the baseline estimates. The processor can use the baseline estimates to create a time entry as explained above.

Figure 12:
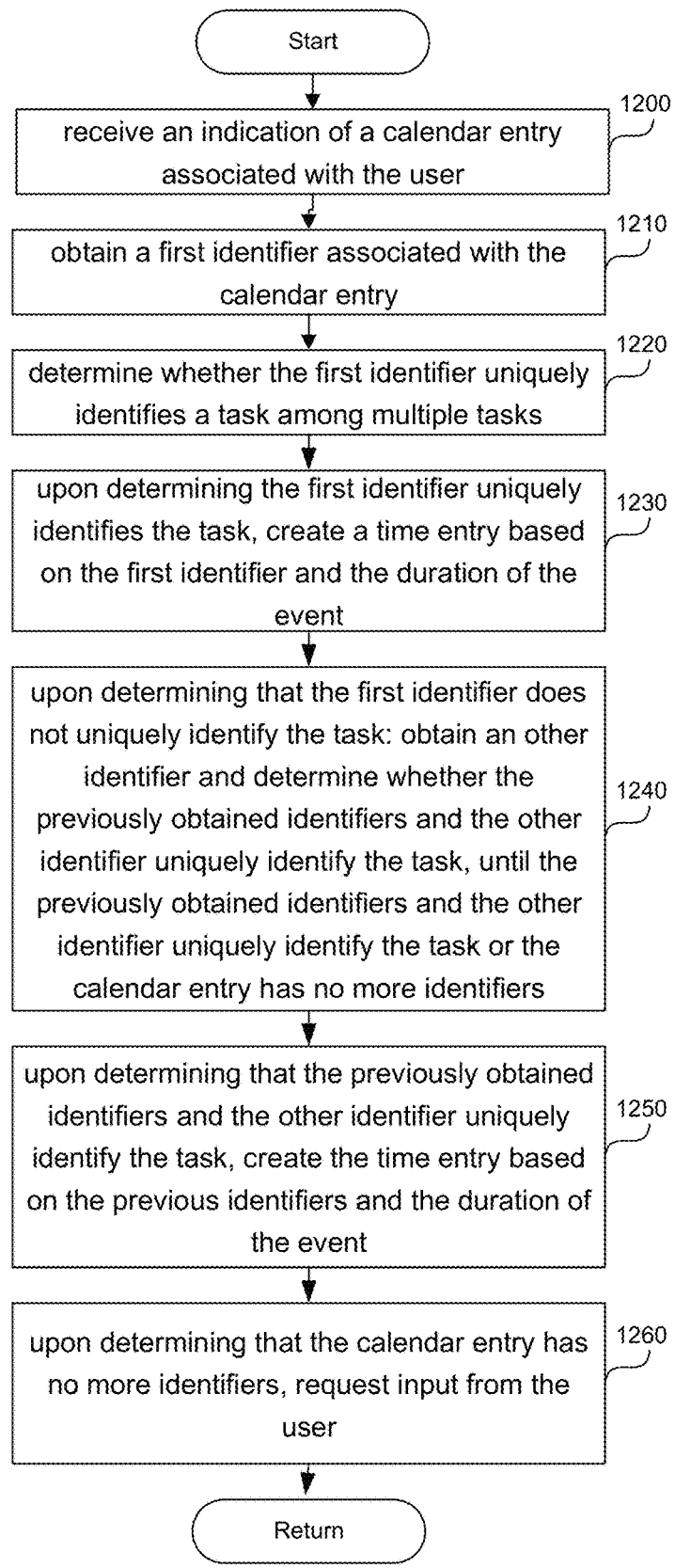
FIG. 12 is a flowchart of a method to automatically create a time entry based on a calendar entry.

FIG. 12 is a flowchart of a method to automatically create a time entry based on a calendar entry. In step 1200, a processor can receive an indication of a calendar entry associated with the user. The indication can be a selection of one or more calendar entries. The calendar entry can describe an event, indicate a duration of the event, and indicate invitees to the event. The calendar entry can come from various platforms such as Google, Outlook, Clockify, etc.

In step 1210, the processor can obtain a first identifier associated with the calendar entry. The first identifier can include the title of the meeting, the location of the meeting, and the invitees to the meeting.

In step 1220, the processor can determine whether the first identifier uniquely identifies a task among multiple tasks. The task uniquely identifies a record to which time can be entered. To identify the task based on the first identifier, the processor can search the database of the time-tracking software application for the first identifier.

In step 1230, upon determining that the first identifier uniquely identifies the task, the processor can create a time entry based on the first identifier and the duration of the event. However, sometimes the first identifier may not uniquely identify the task and may need to be combined with the second identifier.

In step 1240, upon determining that the first identifier does not uniquely identify the task, the processor can perform the following two steps. First, the processor can obtain an other identifier associated with the calendar entry, where the other identifier is different from the previously obtained identifiers. Second, the processor can determine whether the previously obtained identifiers and the other identifier uniquely identify the task. The processor can perform the two steps described above until the previously obtained identifiers and the other identifier uniquely identify the task or the calendar entry has no more identifiers.

In step 1250, upon determining that the previously obtained identifiers and the other identifier uniquely identify the task, the processor can create the time entry based on the previous identifiers and the duration of the event. In step 1260, upon determining that the calendar entry has no more identifiers, the processor can request input from the user.

The processor can obtain the title associated with the calendar entry. The processor can extract from the title associated with the calendar entry a word delineated by a delimiting character such as a space. The processor can query a database of tasks whether the word uniquely identifies the task in the database. Upon determining that the word uniquely identifies a task in the database, the processor can create the time entry.

The processor can obtain an indication of the invitee associated with the calendar entry. The indication of the invitee can include a name, phone number, cryptographic identifier, email, etc. The processor can determine whether the indication of the invitee uniquely identifies the task among the multiple tasks. Upon determining that the indication of the invitee does not uniquely identify the task in the database, the processor can determine whether the indication of the invitee identifies a subset of tasks among the multiple tasks. For example, certain identifiers, such as emails, can be associated with certain tasks in the database. Specifically, a list of identifiers associated with a particular task can uniquely identify the task because the task is uniquely staffed. Upon determining that the indication of the invitee identifies the subset of tasks, the processor can obtain a second identifier associated with the calendar entry. For example, the subset of tasks can be several tasks on which the same group of people are working on together. The second identifier can be the title associated with the task that can identify the particular task associated with the calendar entry. The processor can determine whether the second identifier uniquely identifies the task among the subset of tasks. Upon determining that the second identifier uniquely identifies the task among the subset of tasks, the processor can create a time entry.

The processor can obtain an indication of the location associated with the calendar entries. The location can be a physical or a virtual (e.g., Internet) location. The processor can determine whether the indication of the location uniquely identifies the task among the multiple tasks. For example, the location can be a physical address of the headquarters of the client, and the physical address can uniquely identify the client. In another example, the Internet location can include an ID associated with the client. Upon determining that the indication of the location does not uniquely identify the task in the database, the processor can determine whether the indication of the location identifies a subset of tasks among the multiple tasks. For example, the location can indicate the client, but the client can be associated with multiple tasks. Consequently, the location identifies the multiple tasks associated with the client, and another identifier is needed to determine the specific task. Upon determining that the indication of the location identifies the subset of tasks, the processor can obtain a second identifier associated with the calendar entry. The processor can determine whether the second identifier uniquely identifies the task among the subset of tasks. For example, the second identifier can be the list of emails associated with the people working on the task and can uniquely identify the specific task among the multiple tasks associated with the client. Upon determining that the second identifier uniquely identifies the task among the subset of tasks, the processor can create a time entry.

The processor can start a timer from the calendar entry and analyze the measured time versus scheduled time. The processor can provide a user interface element associated with the calendar entry, where the user interface element is configured to enable the user to start a timer and to stop a timer. The processor can receive an indication to create a start time and an indication to create a stop time. Based on a difference between the start time and the stop time, the processor can determine the duration associated with the calendar entry. Further, the processor can store the duration associated with the calendar entry. If there are multiple stored entries, the process can average the stored entries. The processor can receive an indication of a second calendar entry associated with the first calendar entry. The indication of the second calendar entry can include the same attendees, the same place, and the same title as the calendar entry. Based on the stored duration, the processor can suggest a second duration associated with the second calendar entry.

The processor can automatically create a description associated with the time entry. The processor can obtain an indication of the invitee associated with the calendar entry. The processor can create a description associated with the time entry based on the indication of the invitee and a predetermined text. For example, the description associated with the time entry can state "attend a meeting with <the list of invitees>."

Figure 13A:
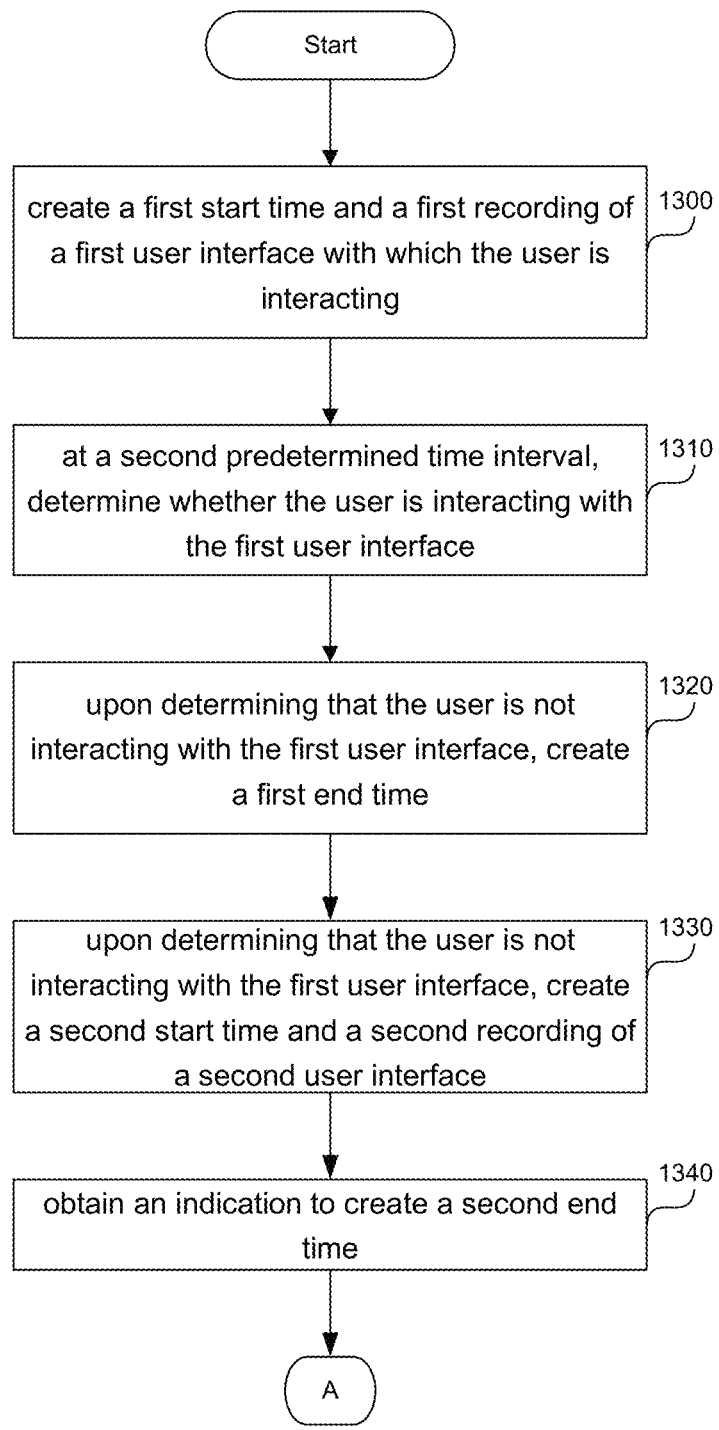
FIGS. 13A-13B are a flowchart of a method to create a time entry based on automatically tracking user activity.
Figure 13B:
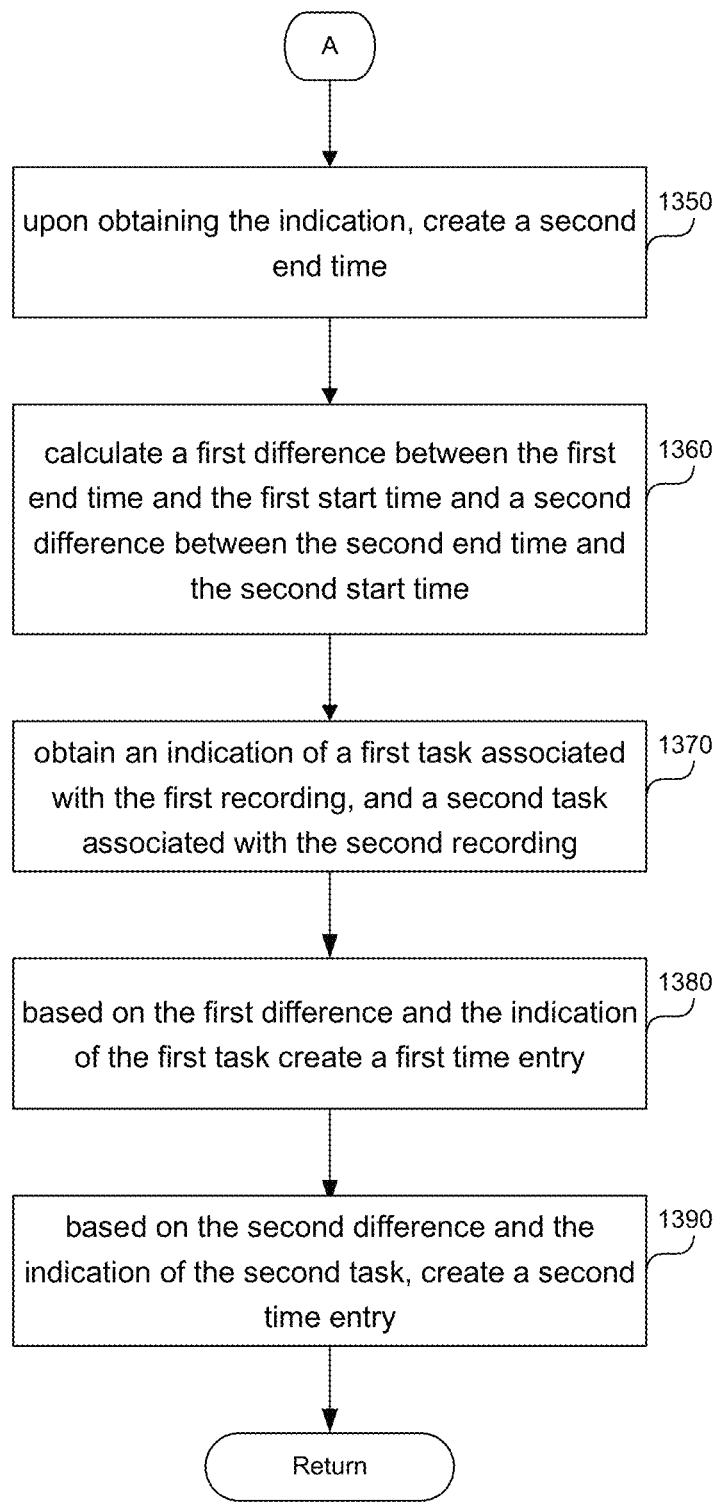

FIGS. 13A-13B are a flowchart of a method to create a time entry based on automatically tracking user activity. In step 1300, a processor can create a first start time and a first recording of a first user interface with which the user is interacting. The recording can be a video or an image of the user interface. The processor can create a recording at a first predetermined time interval, such as every five minutes.

In step 1310, at a second predetermined time interval, the processor can determine whether the user is interacting with the first user interface. The second predetermined time interval can be the same as the first predetermined time interval or can be different. The second predetermined time interval can be triggered when the user changes the first user interface or when the user opens a new file to the first user interface.

In step 1320, upon determining that the user is not interacting with the first user interface, the processor can create a first end time. In step 1330, upon determining that the user is not interacting with the first user interface, the processor can create a second start time and a second recording of a second user interface with which the user is interacting. The processor can create the recording at the first predetermined time interval.

In step 1340, the processor can obtain an indication to create a second end time. To obtain the indication, the processor can detect that the user has ceased to interact with the second user interface, or the processor can receive an indication from the user to provide a summary of the recorded activity.

In step 1350, upon obtaining the indication, the processor can create a second end time. In step 1360, the processor can calculate a first difference between the first end time and the first start time and a second difference between the second end time and the second start time.

In step 1370, the processor can obtain an indication of a first task associated with the first recording and an indication of a second task associated with the second recording. The processor can create the indication of the first task automatically, or the processor can receive the indication of the first task from the user.

In step 1380, based on the first difference and the indication of the first task, the processor can create a first time entry, where the first time entry includes a first time duration associated with the first task. The time entry can include task identifier 123675.01 and a task duration of 1 hour.

In step 1390, based on the second difference and the indication of the second task, the processor can create a second time entry, where the second time entry includes a second time duration associated with the second task.

To obtain the indication of the first task, the processor can obtain a first identifier associated with the first user interface, where the first identifier includes a name associated with the first user interface, a name of a file associated with the first user interface, or metadata associated with the file associated with the first user interface. The processor can determine whether the first identifier uniquely identifies the first task. Upon determining that the first identifier uniquely identifies the first task, the processor can determine that the indication of the first task is the first identifier. Upon determining that the first identifier does not uniquely identify the first task, the processor can determine whether the first identifier uniquely identifies a subset of tasks among the multiple tasks. Upon determining that the first identifier identifies the subset of tasks, the processor can obtain a second identifier associated with the first user interface. The processor can determine whether the second identifier uniquely identifies the first task among the subset of tasks. Upon determining that the second identifier uniquely identifies the first task among the subset of tasks, the processor can determine that the indication of the first task is a combination of the first identifier and the second identifier.

The processor can obtain a first identifier associated with the first user interface, where the first identifier includes a name associated with the first user interface, a name of a file associated with the first user interface, or metadata associated with the file associated with the first user interface. Based on the first identifier, the processor can determine the first task. The processor can create the first time entry based on the first task and a first time duration.

The processor can determine whether the user is interacting with the first user interface. The processor can obtain a second identifier associated with the first user interface, where the second identifier includes a name associated with the first user interface, a name of a file associated with the first user interface, or metadata associated with the file associated with the first user interface. Based on the second identifier, the processor can determine the second task. The processor can create the second time entry based on the second task and a second time duration. The processor can determine whether the first task and the second task are the same. Upon determining that the first task and the second task are not the same, the processor can determine that the user is not interacting with the first user interface.

The processor can obtain the indication of the first task. The processor can determine a location associated with the user. The location can be a physical location or a virtual location. Based on the location, the processor can determine the first task. The processor can determine the physical location by obtaining a geolocation of a user device associated with the user participating in a meeting.

The processor can iteratively identify the task by combining multiple identifiers. The processor can obtain a hierarchical identification of the first task, where the hierarchical identification uniquely identifies the first task, and includes a first level identifier and a second level identifier. The first level identifier, e.g., a client ID, can include multiple second level identifiers, e.g., tasks. The processor can obtain a first identifier associated with the first user interface, where the first identifier includes a name associated with the first user interface, a name of a file associated with the first user interface, or metadata associated with the file associated with the first user interface.

The processor can extract from the first identifier a word delineated by a delimiting character, such as a space (" "), a backslash ("\"), a colon (":"), a hyphen ("-"), etc. The processor can determine whether the word uniquely identifies the first task. Upon determining that the word does not uniquely identify the first task, the processor can determine whether the word uniquely identifies the first level identifier.

Upon determining that the word uniquely identifies the first level identifier, the processor can perform the following two steps. First, the processor can obtain a second word from the identifier, where the word and the second word are different. Second, the processor can determine whether the second word uniquely identifies the second level identifier associated with the first level identifier. The processor can perform the two steps described above until determining that the second word uniquely identifies the second level identifier associated with the first level identifier. Upon determining that the second word uniquely identifies a second level identifier associated with the first level identifier, the processor can create the first time entry based on the difference between the first start time and the first end time.

The processor can use a file path to identify the task. The processor can obtain a hierarchical identification of the first task, where the hierarchical identification uniquely identifies the first task and includes a first level identifier and a second level identifier. The first level identifier can include multiple second level identifiers. The processor can obtain an identifier associated with the first user interface, where the identifier includes a file path. The processor can extract from the file path one or more words delineated by a file path delimiting character such as a slash ("/"), a backslash character ("\"), or a colon (":"). Upon determining that the word does not uniquely identify the first task, the processor can determine whether the word uniquely identifies the first level identifier.

Upon determining that the word uniquely identifies the first level identifier, the processor can iteratively perform the following two steps. First, the processor can obtain a second word from the identifier, where the word and the second word are different. Second, the processor can determine whether the second word uniquely identifies the second level identifier associated with the first level identifier. The processor can perform the two steps described above until determining that the second word uniquely identifies the second level identifier associated with the first level identifier. Upon determining that the second word uniquely identifies a second level identifier associated with the first level identifier, the processor can create the first time entry based on the difference between the start time and the end time.

The processor can determine the task based on the name associated with the first user interface. The processor can obtain a name associated with the first user interface. The name can be the name of the file or a subject line of an email. The processor can extract from the name associated with the first user interface the word delineated by the delimiting character, including a space, where the word includes a number.

Based on the first recording, the first difference, the second recording, and the second difference, the processor can create a presentation to the user indicating the first user interface and an amount of time spent using the first user interface, and the second user interface and an amount of time spent using the second user interface.

Computer System

Figure 14:
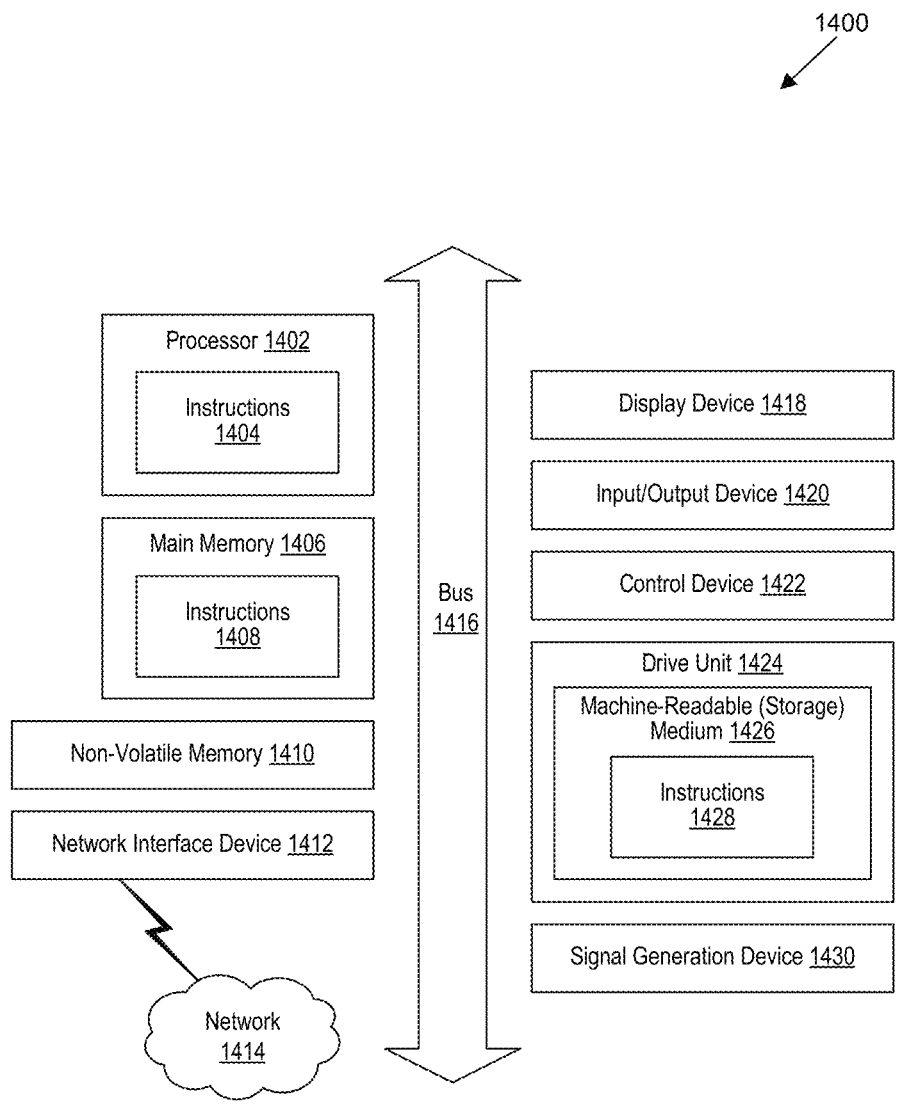
FIG. 14 is a block diagram that illustrates an example of a computer system in which at least some operations described herein can be implemented.

FIG. 14 is a block diagram that illustrates an example of a computer system 1400 in which at least some operations described herein can be implemented. As shown, the computer system 1400 can include one or more processors 1402, main memory 1406, non-volatile memory 1410, a network interface device 1412, a video display device 1418, an input/output device 1420, a control device 1422 (e.g., keyboard and pointing device), a drive unit 1424 that includes a machine-readable (storage) medium 1426, and a signal generation device 1430, which are communicatively connected to a bus 1416. The bus 1416 represents one or more physical buses and/or point-to-point connections that are connected by appropriate bridges, adapters, or controllers. Various common components (e.g., cache memory) are omitted from FIG. 14 for brevity. Instead, the computer system 1400 is intended to illustrate a hardware device on which components illustrated or described relative to the examples of the Figures and any other components described in this specification can be implemented.

The computer system 1400 can take any suitable physical form. For example, the computing system 1400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1400. In some implementations, the computer system 1400 can be an embedded computer system, a system-on-chip (SOC), a single-board computer system (SBC), or a distributed system, such as a mesh of computer systems, or include one or more cloud components in one or more networks. Where appropriate, one or more computer systems 1400 can perform operations in real time, near real time, or in batch mode.

The network interface device 1412 enables the computing system 1400 to mediate data in a network 1414 with an entity that is external to the computing system 1400 through any communication protocol supported by the computing system 1400 and the external entity. Examples of the network interface device 1412 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1406, non-volatile memory 1410, machine-readable (storage) medium 1426) can be local, remote, or distributed. Although shown as a single medium, the machine-readable (storage) medium 1426 can include multiple media (e.g., a centralized/distributed database and/or associated caches and servers) that store one or more sets of instructions 1428. The machine-readable (storage) medium 1426 can include any medium that is capable of storing, encoding, or carrying a set of instructions for execution by the computing system 1400. The machine-readable (storage) medium 1426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in computing device(s). When read and executed by the processor 1402, the instruction(s) cause the computing system 1400 to perform operations to execute elements involving the various aspects of the disclosure.

Remarks

The terms "example," "embodiment," and "implementation" are used interchangeably. For example, references to "one example" and "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of the invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium, excluding transitory signals and carrying instructions, which, when executed by at least one data processor of a system, cause the system to:
   create a first start time and a first recording of a first user interface with which a user is interacting, wherein the first recording is created at a first predetermined time interval;
   at a second predetermined time interval, determine whether the user is interacting with the first user interface;
   upon determining that the user is not interacting with the first user interface, create a first end time;
   upon determining that the user is not interacting with the first user interface, create a second start time and a second recording of a second user interface with which the user is interacting, wherein the second recording is created at the first predetermined time interval;
   at the second predetermined time interval, determine whether the user is interacting with the second user interface;
   upon determining that the user is not interacting with the second user interface, create a second end time;
   calculate a first difference between the first end time and the first start time and a second difference between the second end time and the second start time;
   present the first recording, the first difference, the second recording, and the second difference to the user;
   obtain an indication of a first task associated with the first recording and an indication of a second task associated with the second recording;
   obtain a hierarchical identification of the first task, wherein the hierarchical identification uniquely identifies the first task, wherein the hierarchical identification includes a first level identifier, and wherein the first level identifier includes multiple second level identifiers;
   obtain a first identifier associated with the first user interface, wherein the first identifier includes a name associated with the first user interface, a name of a file associated with the first user interface, or metadata associated with the file associated with the first user interface;
   extract from the first identifier a word delineated by a delimiting character;
   determine whether the word uniquely identifies the first task;
   upon determining that the word does not uniquely identify the first task, determine whether the word uniquely identifies the first level identifier;
   upon determining that the word uniquely identifies the first level identifier, iteratively perform the steps:
      obtain a second word from the first identifier, wherein the word and the second word are different; and
      determine whether the second word uniquely identifies a second level identifier among the multiple second level identifiers;
   perform the steps until determining that the second word uniquely identifies the second level identifier associated with the first level identifier;
   upon determining that the second word uniquely identifies the second level identifier associated with the first level identifier, create a first time entry based on the first difference between the first start time and the first end time, wherein the first time entry includes a first time duration associated with the first task;
   based on the second difference and the indication of the second task, create a second time entry, wherein the second time entry includes a second time duration associated with the second task; and
   based on the first recording, the first difference, the second recording, and the second difference, create a presentation to the user indicating the first user interface and an amount of time spent using the first user interface, and the second user interface and an amount of time spent using the second user interface.

2. The computer-readable storage medium of claim 1, wherein the instructions to obtain the indication of the first task comprise instructions to:
   obtain a second identifier associated with the first user interface, wherein the second identifier includes the name associated with the first user interface, the name of the file associated with the first user interface, or the metadata associated with the file associated with the first user interface;
   determine whether the second identifier uniquely identifies the first task;
   upon determining that the second identifier uniquely identifies the first task, determine that the indication of the first task is the second identifier;
   upon determining that the second identifier does not uniquely identify the first task, determine whether the second identifier uniquely identifies a subset of tasks among multiple tasks;
   upon determining that the second identifier uniquely identifies the subset of tasks, obtain a third identifier associated with the first user interface;
   determine whether the third identifier uniquely identifies the first task among the subset of tasks; and
   upon determining that the third identifier uniquely identifies the first task among the subset of tasks, determine that the indication of the first task is a combination of the second identifier and the third identifier.

3. The computer-readable storage medium of claim 1, comprising instructions to:
   obtain a second identifier associated with the first user interface, wherein the second identifier includes the name associated with the first user interface, the name of the file associated with the first user interface, or the metadata associated with the file associated with the first user interface;
   based on the second identifier, determine the first task, wherein the first time entry is configured to be created based on the first task and the first time duration;
   wherein the instructions to determine whether the user is interacting with the first user interface comprise instructions to:

obtain a third identifier associated with the first user interface, wherein the third identifier includes a name associated with the first user interface, a name of a file associated with the first user interface, or metadata associated with the file associated with the first user interface;

based on the third identifier, determine the second task, wherein the second time entry is configured to be created based on the second task and the second time duration;

determine whether the first task and the second task are the same;

upon determining that the first task and the second task are not the same, determine that the user is not interacting with the first user interface.

4. The computer-readable storage medium of claim 1, wherein the instructions to obtain the indication of the first task comprise instructions to:
   determine a location associated with the user; and
   based on the location, determine the first task.

5. The computer-readable storage medium of claim 1, comprising instructions to:
   obtain a second identifier associated with the first user interface, wherein the second identifier includes a file path; and
   extract from the file path one or more words delineated by a file path delimiting character.

6. The computer-readable storage medium of claim 1, recording comprise comprising instructions to:
   extract from the name associated with the first user interface the word delineated by the delimiting character, including a space, wherein the word includes a number.

7. A system comprising:
   at least one hardware processor; and
   at least one non-transitory memory storing instructions, which, when executed by the at least one hardware processor, cause the system to:
      create a first start time and a first recording of a first user interface with which a user is interacting, wherein the first recording is created at a first predetermined time interval;
      at a second predetermined time interval, determine whether the user is interacting with the first user interface;
      upon determining that the user is not interacting with the first user interface, create a first end time;
      upon determining that the user is not interacting with the first user interface, create a second start time and a second recording of a second user interface with which the user is interacting, wherein the second recording is created at the first predetermined time interval;
      obtain an indication to create a second end time;
      upon obtaining the indication, create the second end time;
      calculate a first difference between the first end time and the first start time and a second difference between the second end time and the second start time;
      obtain an indication of a first task associated with the first recording and an indication of a second task associated with the second recording;
      obtain a hierarchical identification of the first task, wherein the hierarchical identification uniquely identifies the first task, wherein the hierarchical identification includes a first level identifier, and wherein the first level identifier includes multiple second level identifiers;
      obtain a first identifier associated with the first user interface, wherein the first identifier includes a name associated with the first user interface, a name of a file associated with the first user interface, or metadata associated with the file associated with the first user interface;
      extract from the first identifier a word delineated by a delimiting character;
      determine whether the word uniquely identifies the first task;
      upon determining that the word does not uniquely identify the first task, determine whether the word uniquely identifies the first level identifier;
      upon determining that the word uniquely identifies the first level identifier, iteratively perform the steps:
         obtain a second word from the first identifier, wherein the word and the second word are different; and
         determine whether the second word uniquely identifies a second level identifier among the multiple second level identifiers;
      perform the steps until determining that the second word uniquely identifies the second level identifier associated with the first level identifier;
      upon determining that the second word uniquely identifies the second level identifier associated with the first level identifier, create a first time entry based on the first difference between the first start time and the first end time, wherein the first time entry includes a first time duration associated with the first task;
      based on the second difference and the indication of the second task, create a second time entry, wherein the second time entry includes a second time duration associated with the second task; and
      based on the first recording, the first difference, the second recording, and the second difference, create a presentation to the user indicating the first user interface and an amount of time spent using the first user interface, and the second user interface and an amount of time spent using the second user interface.

8. The system of claim 7, wherein the instructions to obtain the indication of the first task comprise instructions to:
   obtain a second identifier associated with the first user interface, wherein the second identifier includes the name associated with the first user interface, the name of the file associated with the first user interface, or the metadata associated with the file associated with the first user interface;
   determine whether the second identifier uniquely identifies the first task;
   upon determining that the second identifier uniquely identifies the first task, determine that the indication of the first task is the first identifier;
   upon determining that the first identifier does not uniquely identify the first task, determine whether the second identifier uniquely identifies a subset of tasks among multiple tasks;
   upon determining that the second identifier uniquely identifies the subset of tasks, obtain a third identifier associated with the first user interface; determine whether the third identifier uniquely identifies the first task among the subset of tasks; and upon determining that the third identifier uniquely identifies the first task among the subset of tasks, determine that the indication of the first task is a combination of the second identifier and the third identifier.

9. The system of claim 7, comprising instructions to:
obtain a second identifier associated with the first user interface, wherein the second identifier includes the name associated with the first user interface, the name of the file associated with the first user interface, or the metadata associated with the file associated with the first user interface;
based on the second identifier, determine the first task, wherein the first time entry is configured to be created based on the first task and the first time duration;
wherein the instructions to determine whether the user is interacting with the first user interface comprise instructions to:
  obtain a third identifier associated with the first user interface, wherein the third identifier includes the name associated with the first user interface, the name of the file associated with the first user interface, or the metadata associated with the file associated with the first user interface;
  based on the third identifier, determine the second task, wherein the second time entry is configured to be created based on the second task and the second time duration;
  determine whether the first task and the second task are the same; and
  upon determining that the first task and the second task are not the same, determine that the user is not interacting with the first user interface.

10. The system of claim 7, wherein the instructions to obtain the indication of the first task comprise instructions to:
determine a location associated with the user; and
based on the location, determine the first task.

11. The system of claim 7, comprising instructions to:
obtain a second identifier associated with the first user interface, wherein the second identifier includes a file path; and
extract from the file path one or more words delineated by a file path delimiting character.

12. The system of claim 7, comprising instructions to:
extract from the name associated with the first user interface the word delineated by the delimiting character, including a space, wherein the word includes a number.

13. A method comprising:
creating, by at least one processor, a first start time and a first recording of a first user interface with which a user is interacting, wherein the first recording is created at a first predetermined time interval;
at a second predetermined time interval, determining, by the at least one processor, whether the user is interacting with the first user interface;
upon determining that the user is not interacting with the first user interface, creating, by the at least one processor, a first end time;
upon determining that the user is not interacting with the first user interface, creating, by the at least one processor, a second start time and a second recording of a second user interface with which the user is interacting, wherein the second recording is created at the first predetermined time interval;
obtaining, by the at least one processor, an indication to create a second end time;
upon obtaining the indication, creating, by the at least one processor, the second end time;
calculating, by the at least one processor, a first difference between the first end time and the first start time and a second difference between the second end time and the second start time;
obtaining, by the at least one processor, an indication of a first task associated with the first recording and an indication of a second task associated with the second recording;
obtaining, by the at least one processor, a hierarchical identification of the first task, wherein the hierarchical identification uniquely identifies the first task, wherein the hierarchical identification includes a first level identifier, and wherein the first level identifier includes multiple second level identifiers;
obtaining, by the at least one processor, a first identifier associated with the first user interface, wherein the first identifier includes a name associated with the first user interface, a name of a file associated with the first user interface, or metadata associated with the file associated with the first user interface;
extracting, by the at least one processor, from the first identifier a word delineated by a delimiting character;
determining, by the at least one processor, whether the word uniquely identifies the first task;
upon determining that the word does not uniquely identify the first task, determining, by the at least one processor, whether the word uniquely identifies the first level identifier;
upon determining that the word uniquely identifies the first level identifier, iteratively performing, by the at least one processor, the steps:
  obtaining, by the at least one processor, a second word from the first identifier, wherein the word and the second word are different; and
  determining, by the at least one processor, whether the second word uniquely identifies a second level identifier among the multiple second level identifiers;
performing, by the at least one processor, the steps until determining that the second word uniquely identifies the second level identifier associated with the first level identifier;
upon determining that the second word uniquely identifies the second level identifier associated with the first level identifier, creating, by the at least one processor, a first time entry based on the first difference between the first start time and the first end time, wherein the first time entry includes a first time duration associated with the first task;
based on the second difference and the indication of the second task, creating, by the at least one processor, a second time entry, wherein the second time entry includes a second time duration associated with the second task; and
based on the first recording, the first difference, the second recording, and the second difference, creating, by the at least one processor, a presentation to the user indicating the first user interface and an amount of time spent using the first user interface, and the second user interface and an amount of time spent using the second user interface.

14. The method of claim 13, wherein obtaining the indication of the first task comprises:
obtaining, by the at least one processor, a second identifier associated with the first user interface, wherein the second identifier includes the name associated with the first user interface, the name of the file associated with the first user interface, or the metadata associated with the file associated with the first user interface;

determining, by the at least one processor, whether the second identifier uniquely identifies the first task;

upon determining that the second identifier uniquely identifies the first task, determining, by the at least one processor, that the indication of the first task is the second identifier;

upon determining that the second identifier does not uniquely identify the first task, determining, by the at least one processor, whether the second identifier uniquely identifies a subset of tasks among multiple tasks;

upon determining that the second identifier uniquely identifies the subset of tasks, obtaining, by the at least one processor, a third identifier associated with the first user interface;

determining, by the at least one processor, whether the third identifier uniquely identifies the first task among the subset of tasks; and upon determining that the third identifier uniquely identifies the first task among the subset of tasks, determining, by the at least one processor, that the indication of the first task is a combination of the second identifier and the third identifier.

15. The method of claim 13, comprising:

obtaining, by the at least one processor, a second identifier associated with the first user interface, wherein the second identifier includes the name associated with the first user interface, the name of the file associated with the first user interface, or the metadata associated with the file associated with the first user interface;

based on the second identifier, determining, by the at least one processor, the first task, wherein the first time entry is configured to be created based on the first task and the first time duration;

wherein determining whether the user is interacting with the first user interface comprises:

obtaining, by the at least one processor, a third identifier associated with the first user interface, wherein the third identifier includes the name associated with the first user interface, the name of the file associated with the first user interface, or the metadata associated with the file associated with the first user interface;

based on the third identifier, determining, by the at least one processor, the second task, wherein the second time entry is configured to be created based on the second task and the second time duration;

determining, by the at least one processor, whether the first task and the second task are the same; and upon determining that the first task and the second task are not the same, determining, by the at least one processor, that the user is not interacting with the first user interface.

16. The method of claim 13, comprising:

obtaining, by the at least one processor, a second identifier associated with the first user interface, wherein the second identifier includes a file path; and extracting, by the at least one processor, from the file path one or more words delineated by a file path delimiting character.

* * * * *